(12) United States Patent
Minamigata et al.

(10) Patent No.: US 8,528,937 B2
(45) Date of Patent: Sep. 10, 2013

(54) STEERING COLUMN SUPPORT APPARATUS

(75) Inventors: Takahiro Minamigata, Gunma (JP); Minao Umeda, Gunma (JP); Takeshi Fujiwara, Gunma (JP); Osamu Tatewaki, Gunma (JP); Kiyoshi Sadakata, Gunma (JP); Toru Segawa, Gunma (JP); Nobuyuki Nishimura, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/379,550

(22) PCT Filed: Oct. 13, 2011

(86) PCT No.: PCT/JP2011/073504
§ 371 (c)(1),
(2), (4) Date: Feb. 14, 2012

(87) PCT Pub. No.: WO2012/060193
PCT Pub. Date: May 10, 2012

(65) Prior Publication Data
US 2012/0169035 A1    Jul. 5, 2012

(30) Foreign Application Priority Data

| Nov. 2, 2010 | (JP) | 2010-246210 |
| Nov. 10, 2010 | (JP) | 2010-252135 |
| Nov. 16, 2010 | (JP) | 2010-256137 |
| Nov. 19, 2010 | (JP) | 2010-258591 |

(51) Int. Cl.
*B62D 1/19* (2006.01)
(52) U.S. Cl.
USPC ............... 280/777; 280/775; 74/493

(58) Field of Classification Search
USPC ........... 280/775, 777; 74/493, 492; 188/371, 188/377
See application file for complete search history.

(56) References Cited

U.S. PATENT DOCUMENTS

| 5,609,364 | A  * | 3/1997 | Fouquet et al. | 280/777 |
| 7,219,927 | B2 * | 5/2007 | Lee | 280/777 |
| 7,441,808 | B2 * | 10/2008 | Eggers et al. | 280/777 |
| 7,648,168 | B2 * | 1/2010 | Oh | 280/777 |
| 7,914,044 | B2 * | 3/2011 | Park | 280/777 |

FOREIGN PATENT DOCUMENTS

| EP | 1939064 | 7/2008 |
| GB | 02469678 | * 10/2010 |
| JP | 51119231 | 9/1976 |
| JP | 51121929 | 10/1976 |

(Continued)

*Primary Examiner* — Ruth Ilan
*Assistant Examiner* — Darlene P Condra
(74) *Attorney, Agent, or Firm* — Katten Muchin Rosenman LLP

(57) ABSTRACT

A steering column support apparatus that is capable of simplifying tuning for stabilizing forward displacement of a steering wheel during a secondary collision, keeping material costs, processing costs and assembly costs of an energy absorbing member low, and when necessary, preventing the steering wheel from dropping down excessively during a secondary collision. A locking capsule 47 that is fastened to a bracket 3 on the column side is held inside a locking hole 45 of a bracket 11*b* on the vehicle side that is fastened to the vehicle body by a plurality of connecting members that shear during a secondary collision. An energy absorbing member 53 is placed between the locking capsule 47 and the bracket 11*b* on the vehicle side. This energy absorbing member 53 is formed by bending a plastically deformable wire, and allows forward displacement of the locking capsule while absorbing impact energy that is applied to the locking capsule by plastically deforming during a secondary collision.

9 Claims, 36 Drawing Sheets

(56) References Cited

FOREIGN PATENT DOCUMENTS

| JP | 20006821 | 1/2000 |
| JP | 2004058716 A * | 2/2004 |
| JP | 2005219641 | 8/2005 |
| JP | 200769821 | 3/2007 |
| JP | 2007302012 | 11/2007 |
| JP | 2008100597 | 5/2008 |
| JP | 2008222014 | 9/2008 |
| JP | 2010012980 | 1/2010 |
| JP | 2010013010 | 1/2010 |
| WO | 2007046436 | 4/2007 |

* cited by examiner

Fig. 17
(A)
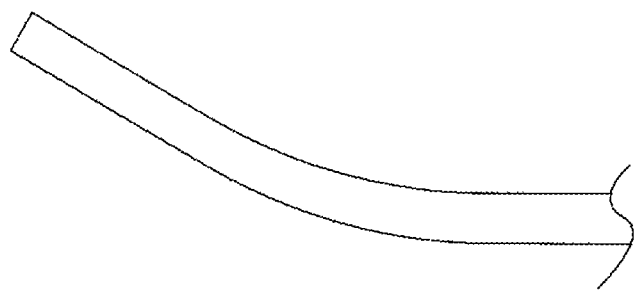
(B)
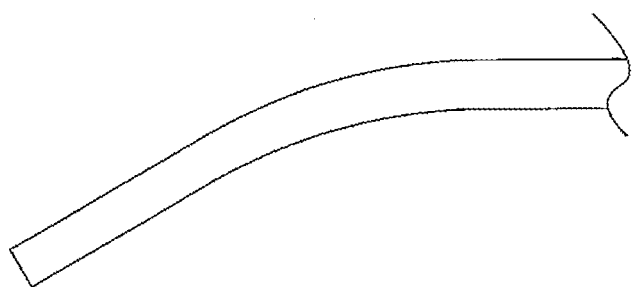
(C)
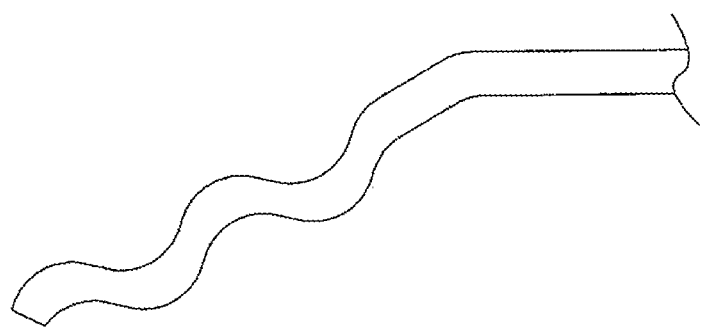

Fig. 22
(A)
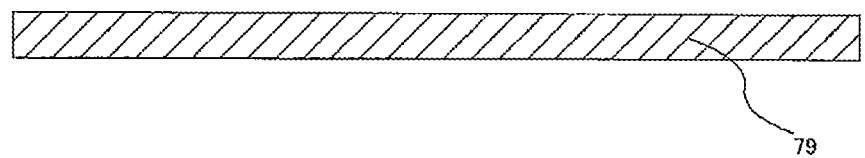
(B)
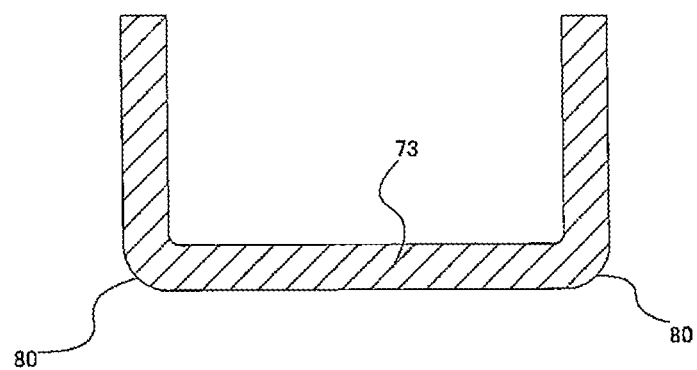
(C)
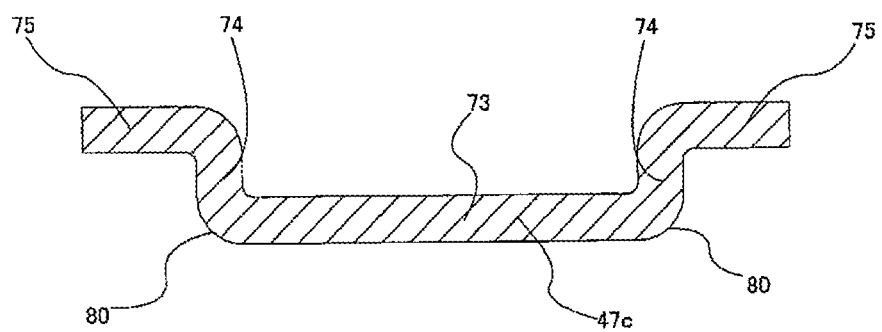

STEERING COLUMN SUPPORT APPARATUS

TECHNICAL FIELD

The present invention relates to a steering column support apparatus that supports a steering column such that the steering column can displace in the forward direction with respect to the vehicle body while absorbing impact energy that is applied to the steering wheel from the body of the driver during a collision accident.

BACKGROUND ART

A steering apparatus for an automobile, as illustrated in FIG. 33, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. The steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that the shaft can transmit torque, and can contract along its entire length due to an impact load, so that when the steering gear unit 2 is displaced in the backward direction due to a primary collision between an automobile and another automobile, that displacement is absorbed, which prevents the steering wheel 1 from displacing in the backward direction via the steering shaft 5 and hitting the body of the driver.

In this kind of steering apparatus for an automobile, in order to protect the body of the driver, this kind of steering apparatus for an automobile requires construction that that allows the steering wheel to displace in the forward direction while absorbing impact energy during a collision accident. In other words, after the primary collision in a collision accident, a secondary collision occurs when the body of the driver collides with the steering wheel 1. In order to protect the driver by lessening the impact applied to the body of the driver during this secondary collision, construction is known (refer to JP51-121929(U), JP2005-219641(A) and JP2000-6821(A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 34 to FIG. 36 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 33) can be fastened to the portion on the rear end section of this steering shaft 5a that protrudes from the opening on the rear end of the steering column 6a. The steering column 6a and the housing 10 are supported by a flat bracket on the vehicle side (not illustrated in the figure) that is fastened to the vehicle body so that they can break away in the forward direction due to an impact load in the forward direction.

To accomplish this, a bracket 12 on the column side that is supported in the middle section of the steering column 6a and a support bracket 13 on the housing side that is supported by the housing 10 are supported with respect to the vehicle body so that they both can break away in the forward direction due to an impact load in the forward direction. These support brackets 12, 13 both comprise installation plate sections 14a, 14b at one or two locations, and cutout sections 15a, 15b are formed in these installation plate sections 14a, 14b so that they are open on the rear end edges. With these cutout sections 15a, 15b covered, sliding plates 16a, 16b are assembled in the portions of the support brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top and bottom plate section that are connected by connecting plate section. Through holes for inserting bolts or studs are formed in portions of the top and bottom plate sections that are aligned with each other. With these sliding plates 16a, 16b mounted on the installation plate sections 14a, 14b, the through holes are aligned with the cutout sections 15a, 15b that are formed in these installation plate sections 14a, 14b.

The bracket 12 on the column side and the bracket 13 on the housing side are supported by the fastening bracket 11 on the vehicle side by screwing nuts onto bolts or studs that are inserted through the cutout sections 15a, 15b in the installation plate sections 14a, 14b and the through holes in the sliding plates 16a, 16b, and tightening the nuts. During a secondary collision, the bolts or studs come out from the cutout sections 15a, 15b together with the sliding plates 16a, 16b, which allows the steering column 6a and the housing 10 to displace in the forward direction together with the brackets 12 on the column side, the bracket 13 on the housing side and the steering wheel 1.

In the example in the figures, energy absorbing members 17 are provided between these bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

As illustrated in FIG. 36, during a secondary collision, the bolts or studs come out from the cutout sections 15a, 15b allowing the bracket 12 on the column side to displace in the forward direction from the normal state illustrated in FIG. 35, and the steering column 6a displaces in the forward direction together with the bracket 12 on the column side. When this happens, the bracket 13 on the housing side as well breaks away from the vehicle body, allowing this bracket 13 on the housing side to displace in the forward direction. As the bracket 12 on the column side displaces in the forward direction, the energy absorbing members 17 plastically deform and absorb impact energy that is transmitted to the bracket 12 on the column side via the steering shaft 5a and the steering column 6a, lessening the impact applied to the body of the driver.

In the case of the construction illustrated in FIG. 34 to FIG. 36, the bracket 12 on the column side is supported by the bracket on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 37 to FIG. 39 illustrate the construction disclosed in this document. In the case of this construction, a locking notch 18 is formed in the center section in the width direction of a bracket 11 on the vehicle side that is fastened to and supported by the vehicle body side and that does not displace in the forward direction even during a secondary collision, and this locking notch 18 is open on the edge of the front end of the bracket 11 on the vehicle side. Moreover, a bracket 12a on the column side is such that it is able to displace in the forward direction together with a steering column 6b during a secondary collision.

Furthermore, both the left and right end sections of a locking capsule 19 that is fastened to this bracket 12a on the column side is locked in the locking notch 18. In other words, locking grooves 20 that are formed on both the left and right side surfaces of the locking capsule 19 engage with the edges on both the left and right sides of the locking notch 18. Therefore, the portions on both the left and right end sections of the locking capsule 19 that exist on the top side of the locking grooves 20 are positioned on the top side of bracket 11 on the vehicle side on both side sections of the locking notch 18. When the bracket 11 on the vehicle side and the locking capsule 19 are engaged by way of the locking grooves 20 and the edges on both sides of the locking notch 18, locking pins 22 are pressure fitted into small locking holes 21a, 21b that are formed in positions in these members 11, 20 that are aligned with each other, joining the members 11, 20 together. These locking pins 22 are made using a relatively soft material such as an aluminum alloy, synthetic resin or the like that will shear under an impact load that is applied during a secondary collision.

When an impact load is applied during a secondary collision from the steering column 6b to the locking capsule 19 by way of the bracket 12a on the column side, these locking pins 22 shear. The locking capsule 19 then comes out in the forward direction from the locking notch 18, which allows the steering column 6b to displace in the forward direction of the steering wheel 1 that is supported by this steering column 6b via the steering shaft.

In the case of the construction illustrated in FIG. 37 to FIG. 39, the engagement section between the locking capsule 19 that is fastened to the bracket 12a on the column side and the bracket 11 on the vehicle side is located at only one location in the center section in the width direction. Therefore, tuning for disengaging this engagement section and causing the steering wheel 1 to displace stably in the forward direction during a secondary collision becomes simple.

However, in the conventional construction, that shape of the bracket 11 on the vehicle side is special, so the construction of connecting and fastening this bracket 11a on the vehicle side to the vehicle body becomes complex, and the assembly height becomes high, therefore there is a problem in that design freedom of the steering apparatus is lost. Moreover, the number of parts increases, the work for processing parts, managing parts and assembling parts becomes troublesome, and the costs increase. Furthermore, the assembly height, for example, the distance from the center of the steering column 6b to the installation surface on the vehicle side becomes large, and there is a disadvantage in that performing design in order that the steering column 6b does not interfere with the knees of the driver becomes difficult.

In addition, in this kind of conventional construction, it is necessary to provide impact absorbing members between the portion of the bracket 11 on the vehicle side that does not displace during a secondary collision and the portion of the steering column 6b that displaces in the forward direction absorb impact energy by plastically deforming due to displacement in this forward direction. For example, preferably energy absorbing members such as disclosed in JP2000-6821 (A) are placed in the center section in the width direction of the steering column 6b, and effectively deform plastically due to forward displacement of the steering column 6b. However, the energy absorbing members disclosed in this document are formed by using a press to punch and bend metal plate, such as steel plate, so the material cost and processing costs are both high. Moreover, it is necessary to connect and fasten the end sections of the energy absorbing members to some portion, so the assembly work is troublesome and the assembly costs are high, and thus the cost of an energy absorbing type steering column support apparatus becomes high.

Furthermore, during a secondary collision, often the case occurs in which the body of the driver collides with the steering wheel in a diagonal direction with respect to the width direction of the vehicle. In such a case, an impact load is applied to the locking capsule 19 in a forward diagonal direction with respect to the width direction of the vehicle, so the direction in which the impact load acts does not always coincide with the axial direction of the steering column 6b, and due to the portion of the impact load in the width direction, the edge of either the left or right side of the locking capsule 19 is strongly pushed toward an inner edge of the locking notch 18. Therefore, a strong friction force occurs between these edges that are strongly pressed together while the locking capsule 19 comes out in the forward direction from the locking notch 18.

When the locking capsule 19 comes out in the forward direction from the locking notch 18, the energy (load) required for this locking capsule 19 to displace in the forward direction becomes large, the larger the angle is between the direction that this locking capsule 19 is pressed and the edge of the one side that is rubbing. At the instant of a secondary collision, as the energy required for causing the locking capsule 19 to displace becomes larger, the impact that is applied to the body of the driver becomes large, which is a problem from the aspect of protecting the driver.

Furthermore, as illustrated in FIG. 33, in a typical steering apparatus for an automobile, the steering column 6b is installed in an inclined direction downward going toward the front, so when the bracket 11 on the vehicle side and the steering column 6b are parallel, this bracket 11 on the vehicle side is also installed in an inclined direction downward going toward the front. Therefore, during a secondary collision, the locking capsule 19 comes out from the locking notch 18 while displacing forward diagonally in the downward direction.

On the other hand, during a secondary collision, a load is applied from the body of the driver to the steering wheel in a direction nearly straight ahead, in other words, parallel with the road surface. Consequently, during a secondary collision, a difference occurs between the direction in which the locking capsule 19 comes out from the locking notch 18, and the direction in which the impact load that is applied to this locking capsule 19 acts. Therefore, the friction force that acts in the area of the friction between the locking capsule 19 and the bracket 11 on the vehicle side becomes large. In other words, a force in the twisting direction is applied to the area of friction between the bracket 11 on the vehicle side and the locking capsule 19, and the contact pressure at that this area of friction becomes high. As a result, a problem occurs in that at the instant that a secondary collision occurs, the energy required for causing the locking capsule 19 to displace in the forward direction becomes large, and performing tuning for protecting the driver becomes troublesome.

RELATED LITERATURE

Patent Literature

[Patent Literature 1] JP51-121929(U)
[Patent Literature 2] JP2005-219641(A)
[Patent Literature 3] JP2000-6821(A)
[Patent Literature 4] JP2007-69821(A)
[Patent Literature 5] JP2008-100597(A)

SUMMARY OF THE INVENTION

Problem to be Solved by the Invention

In consideration of the situation above, the object of the present invention is to provide construction of a steering column support apparatus that simplifies tuning for stabilizing forward displacement of the steering wheel during a secondary collision, suppresses material costs, processing costs and assembly costs for energy absorbing members, and as necessary, can prevent the steering wheel from dropping excessively after a secondary collision.

At the same time, the object of the present invention is to provide construction wherein the edges on the sides of the locking capsule are not strongly pressed against the inner edges of the locking hole of the bracket on the vehicle side, construction wherein regardless of the state of the installation state of the steering column, the locking capsule can easily come out in the forward direction from the locking hole of the bracket on the vehicle side, and construction wherein rigidity can be maintained even when the bracket on the vehicle side has a flat shape.

Means for Solving the Problems

The steering column support apparatus of the present invention comprises:

a bracket on the vehicle side having a locking hole that extends in the axial direction of a steering column and that is located in the center section in the width direction thereof, this bracket on the vehicle side not displacing in the forward during a secondary collision;

a bracket on the column side that is supported by the steering column; and a locking capsule that is fastened to the steering column, and in the fastened state, comprises a locked section with both end sections locked in the locking hole, and a top side section that is formed on the top side of the locked section, having a width dimension that is greater than the maximum width dimension of the locking hole, and having a flange section that is positioned on the top side of the bracket on the vehicle side on both sides of the locking hole.

With the locked section of the locking capsule located on the inside of the locking hole, by connecting the locking capsule and the bracket on the vehicle side by way of connecting members that shear due to an impact load that is applied during a secondary collision, the bracket on the column side is supported by the bracket on the vehicle side so as to be able to break away in the forward direction due to the impact load that is applied during a secondary collision.

Particularly, an energy absorbing member that is provided between the locking capsule and the bracket on the vehicle side absorbs impact energy that is applied to the locking side capsule and allows forward displacement of the locking capsule by plastically deforming during the secondary collision.

This energy absorbing member is formed by bending a wire that is capable of plastic deformation, and comprises a base section having a shape that is open in the rear, a pair of bent back sections that are formed by bending back the wire from the both end sections in the rear of the base section downward and toward the front to form a U shape, and a pair of left and right extending sections that extend forward from the tip ends of the bent back sections; wherein the base section spans from the front surface of top section of the locking capsule along the surfaces on both the left and right sides; the edges on the front sides of the bent back sections face the rear end edge of the bracket on the vehicle side at two locations, left and right; and the extending sections extend from the bent back sections toward the front and are located at two positions, left and right, underneath the bracket on the vehicle side.

Preferably, the base section of the energy absorbing member and the perimeter edge of the locking capsule engage with part of this perimeter edge existing further upward than the base section, so even when the locking capsule has come out all the way forward from the locking hole, the locking capsule is supported by the bracket on the vehicle side by way of the energy absorbing member, preventing the steering column from dropping down.

More specifically, eave sections that protrude further toward the side than the portion underneath are formed on the top end section of the surfaces on the left and right sides of the locking capsule, and the base section of the energy absorbing member is located underneath the eave sections.

Moreover, preferably, by bending parts of the rear end section of the bracket on the vehicle at two locations, left and right, which are at least parts in the width direction of the rear end section of the metal plate of the bracket on the vehicle side, convex surface sections having partial cylindrical surfaces, and hanging plate sections that are located on the bottom sides of these convex surface sections, having small through holes in the forward/backward direction thereof are formed, and with the edges of the front sides of the bent back sections facing the concave surface sections, the extending sections are inserted from the rear toward the front through the small through holes.

Furthermore, preferably, a plurality of connecting members are formed to span between a plurality of through holes that are formed in the flange section and a plurality of small notch sections that are formed at locations on part of the bracket on the vehicle side that are aligned with the plurality of through holes and that are open toward the inside of the locking hole, and part of the material of the connecting members penetrates between the inside surfaces of the locking hole and the surfaces of the locking capsule that face those inside surfaces, covering at least part of the space existing between these surfaces.

In this case, preferably, the material of the plurality of connecting members is synthetic resin, the synthetic resin is injected into the small through holes and small notch sections by injection molding, and part of the synthetic resin covers the entire length of the space that exists between the inside surfaces of the locking hole and the surface of the locking capsule that face those inside surfaces.

Furthermore, preferably, in addition to the space existing between the inside surfaces of the locking hole and the surfaces of the locking capsule that face those inside surfaces, the material of the connecting members cover at least part of the space that exists between the top and bottom surfaces of the bracket on the vehicle side and the opposing surfaces that face these top and bottom surfaces.

On the other hand, preferably, at least the left and right edges of the rear half section of the locking hole are inclined in a direction toward each other going toward the rear, and the edges on the left and right sides of the locked section of the locking capsule are inclined in a direction such that the width dimension between them becomes smaller going toward the rear.

Moreover, preferably, the length in the forward/backward direction of the locking hole is longer than the length in the same direction of the locking capsule, and is long enough that even when the locking capsule has displaced in the forward direction, at least part of the locking capsule is located on the top side of the front end section of the bracket on the vehicle side, making it possible to prevent the locking capsule from dropping down.

In the present invention, the following construction can be used alternatively. In other words, at least the portions of the edges on the left and right sides of the locking hole that engage with the locking capsule before a secondary collision occurs can be inclined in opposite directions with respect to the center line of the locking hole, which is parallel with the center line of the steering column, such that the width dimension in the left/right direction of the locking hole gradually increases going toward the front.

In this case, the exposed portions of the edges on the left and right sides of the locking hole in front of the locking capsule before a secondary collision occurs can also be inclined in opposite directions from each other with respect to the center line of the locking hole, such that the dimension in the left/right direction of the locking hole gradually becomes larger going toward the front.

Construction is also possible wherein instead of causing the exposed portions of the edges on the left and right sides of the locking hole in front of the locking capsule before a secondary collision occurs to be inclined along the entire length, at least the front half portions of the exposed portions are parallel with the center line of the locking hole. Alternatively, construction can be such that at least the front half sections of the exposed portions are inclined inversely with the portion of the edges on the left and right sides of the locking hole that engage with the locking capsule before a secondary collision occurs and in opposite directions from each other with respect to the center line of the locking hole, such that the width dimension of at least the front half sections gradually decreases going toward the front.

In addition, it is possible for the portions on both the left and right sides of the locking hole in the exposed portion of the front section of the bracket on the vehicle side that is further in front of the locking capsule before a secondary collision occurs to be wave shaped in the forward/backward direction.

In the present invention, the bracket on the column side and the locking capsule can be made of metal plate that can be welded. In this case, the locking capsule comprises: a base plate section that overlaps the top surface of the top plate section that is formed on the top end section of the bracket on the column side and is welded and fastened to the top plate section; a pair of left and right raised sections that are bent upward from both end sections in the width direction of the base plate section and that are inclined in the same direction as the edges on the left and right of at least the portions of the locking hole that engage with the locking capsule before a secondary collision, and a pair of left and right flange sections that are bent from the top ends of these raised sections in opposite directions toward the outside. Preferably, together with the bracket on the column side and the locking capsule being welded together, the portion of the bracket on the vehicle side on both sides of the locking hole engages between the top surface of the bracket on the column side and the bottom surface of the flange sections so that the bracket on the column side can break away due to impact energy that is applied during a secondary collision.

In the present invention, it is also additionally preferred that the portion of the bracket on the vehicle side that supports the locking capsule at least before a secondary collision occurs be located in the direction in which the impact load of a secondary collision acts.

In the present invention, alternatively construction can be used as the bracket on the vehicle side wherein a vertical installation plate section that is formed by bending upward or downward at least one of the edge sections on the left and right side of the portion of the bracket on the vehicle side to which the locking capsule is fastened in at least the normal state before a secondary collision occurs. In that case, a vertical installation plate section that extends in the vertical direction is provided on both sides or one side instead of the flat installation plate section that extends in the horizontal direction. With the surface of one side of the vertical installation plate section fitted with an installation surface that is formed on the vehicle body, the bracket on the vehicle side is connected and fastened to the vehicle body.

Effect of the Invention

The steering column support apparatus to which the present invention is applied is able to simplify tuning for stabilizing forward displacement of the steering wheel, keep material costs, processing costs and assembly costs of an energy absorbing member low, reduce the cost of an energy absorbing steering apparatus, and when necessary, prevent the steering wheel from dropping excessively after a secondary collision.

First, simplification of tuning for stabilizing forward displacement of the steering wheel during a secondary collision is achieved by having the bracket on the vehicle side and the locking capsule engage at only the center section in the width direction of the bracket on the vehicle side.

Moreover, by using a member that is formed by bending a wire that can plastically deform as the energy absorbing member, it is possible to obtain an effect of reducing costs by lowering costs of materials, improving the yield of material, and simplifying processing and assembly work.

Preventing the steering wheel from dropping excessively during a secondary collision is achieved by making the length in the forward/backward direction of the locking hole (locking notch) sufficiently longer than the length in the same direction of the locking capsule, so that even after a secondary collision, the locking capsule does not come out in the forward direction completely from the locking hole, and/or by having the base section of the energy absorbing member engage with the perimeter section of the locking capsule, the locking capsule is suspended by the bracket on the vehicle side by way of the energy absorbing member even after a secondary collision.

Furthermore, with the preferred modes of the present invention the following effects can be additionally or alternatively obtained.

(1) Regardless of the direction in which the locking capsule is pushed at the instant that a secondary collision occurs, it is possible to keep the edges on the sides of the locking capsule from pressing strongly against the edges on the side of the locking hole of the bracket on the vehicle side.

(2) Construction is possible wherein the locking capsule can come out smoothly from the locking hole of the bracket on the vehicle side during a secondary collision.

(3) The bracket on the vehicle side can be given sufficient rigidity even without using a metal plate having a large thickness.

BRIEF DESCRIPTION OF THE DRAWINGS

FIG. 17 is a side view illustrating three different examples of the shape of the front half section of the bracket on the vehicle side (fourth to sixth example of the second embodiment of the present invention).

FIGS. 22A to 22C are cross-sectional views of the steps in order for making the locking capsule of the seventh example of the second embodiment from metal plate.

BEST MODES FOR CARRYING OUT THE INVENTION

First Example of First Embodiment

Figure 33:
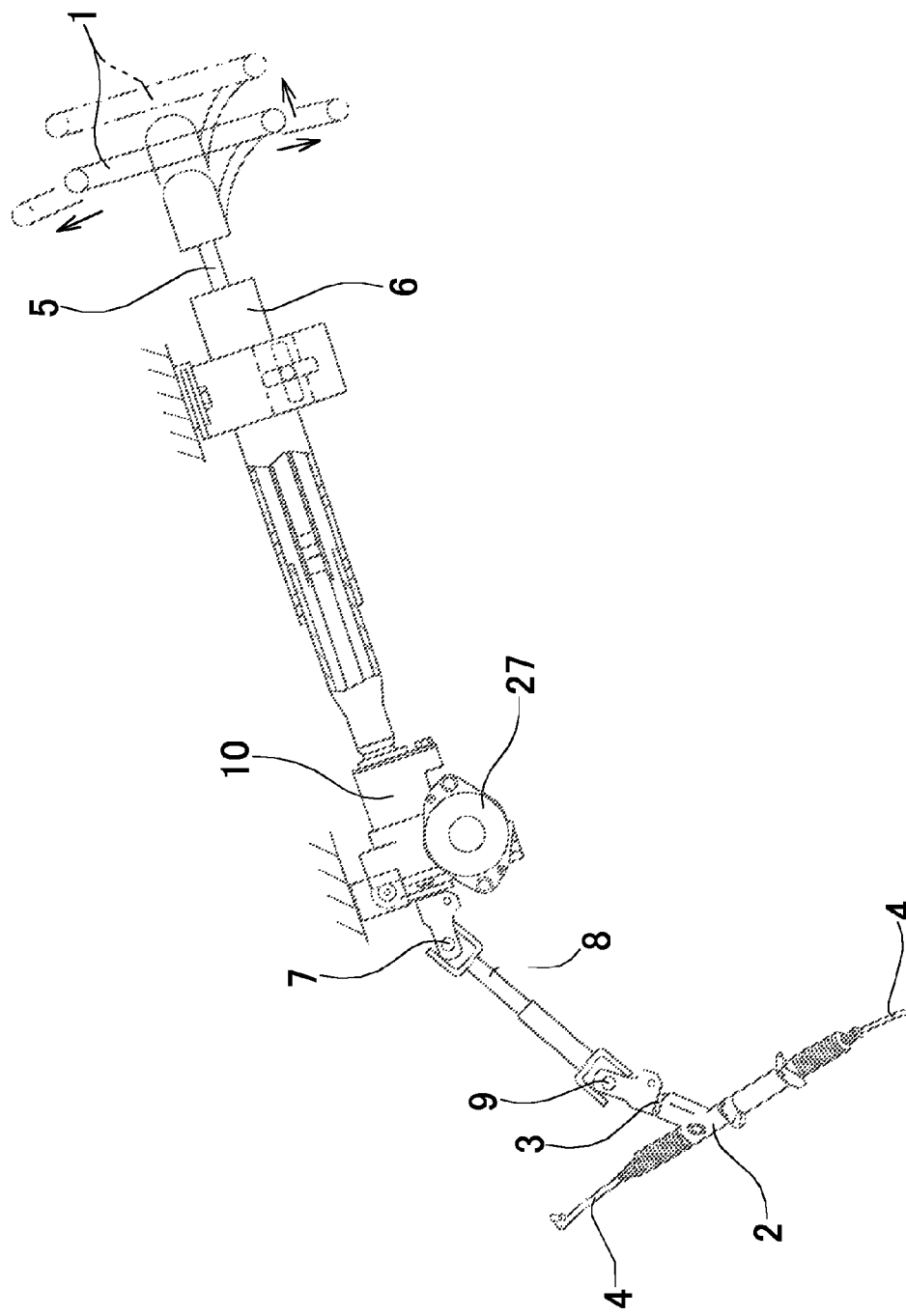
FIG. 33 is a partial cross-sectional view of an example of a conventional steering column support apparatus.
Figure 34:
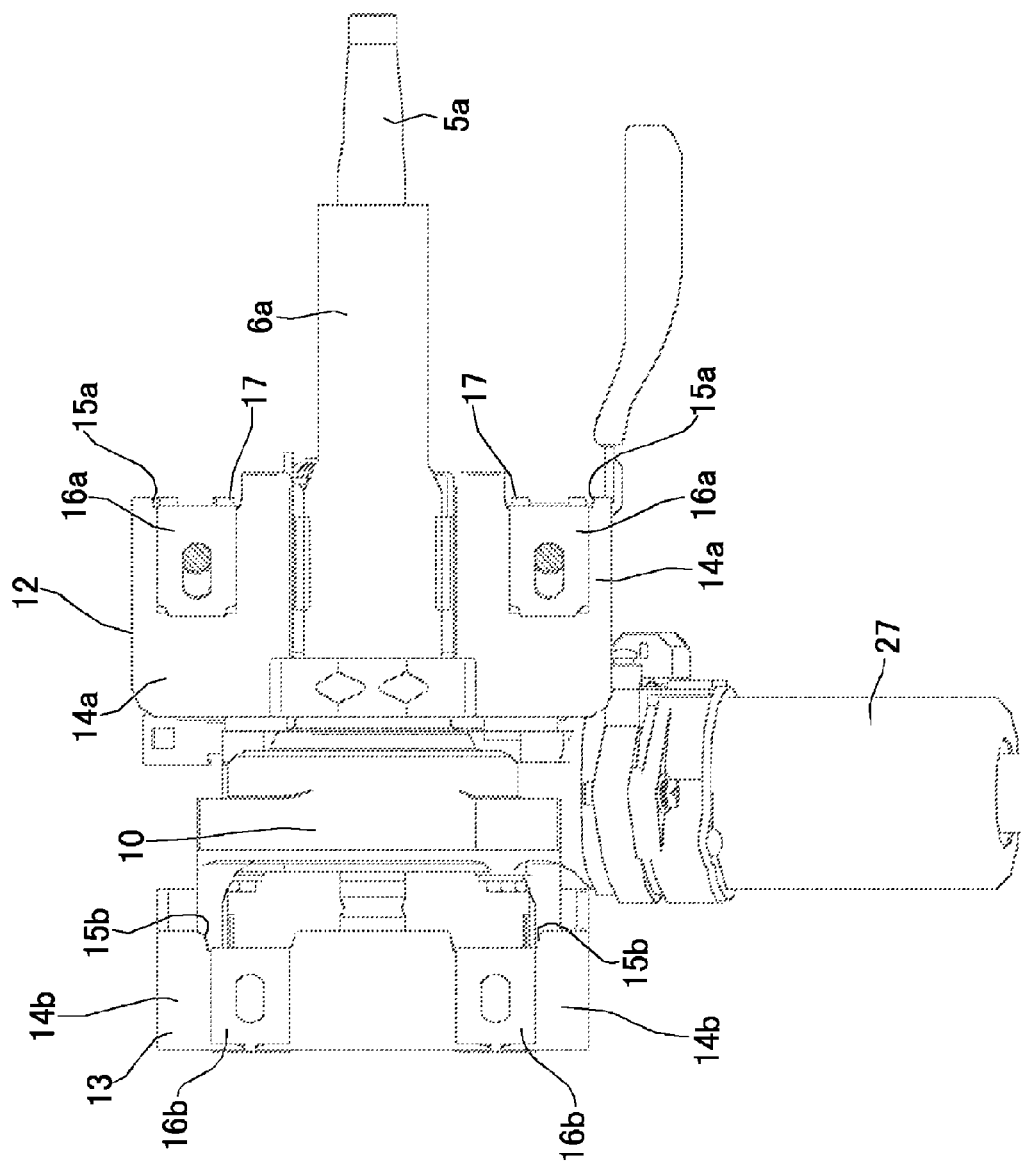
FIG. 34 is a top view of an example of a conventional steering column support apparatus, and illustrates the normal state.
Figure 35:
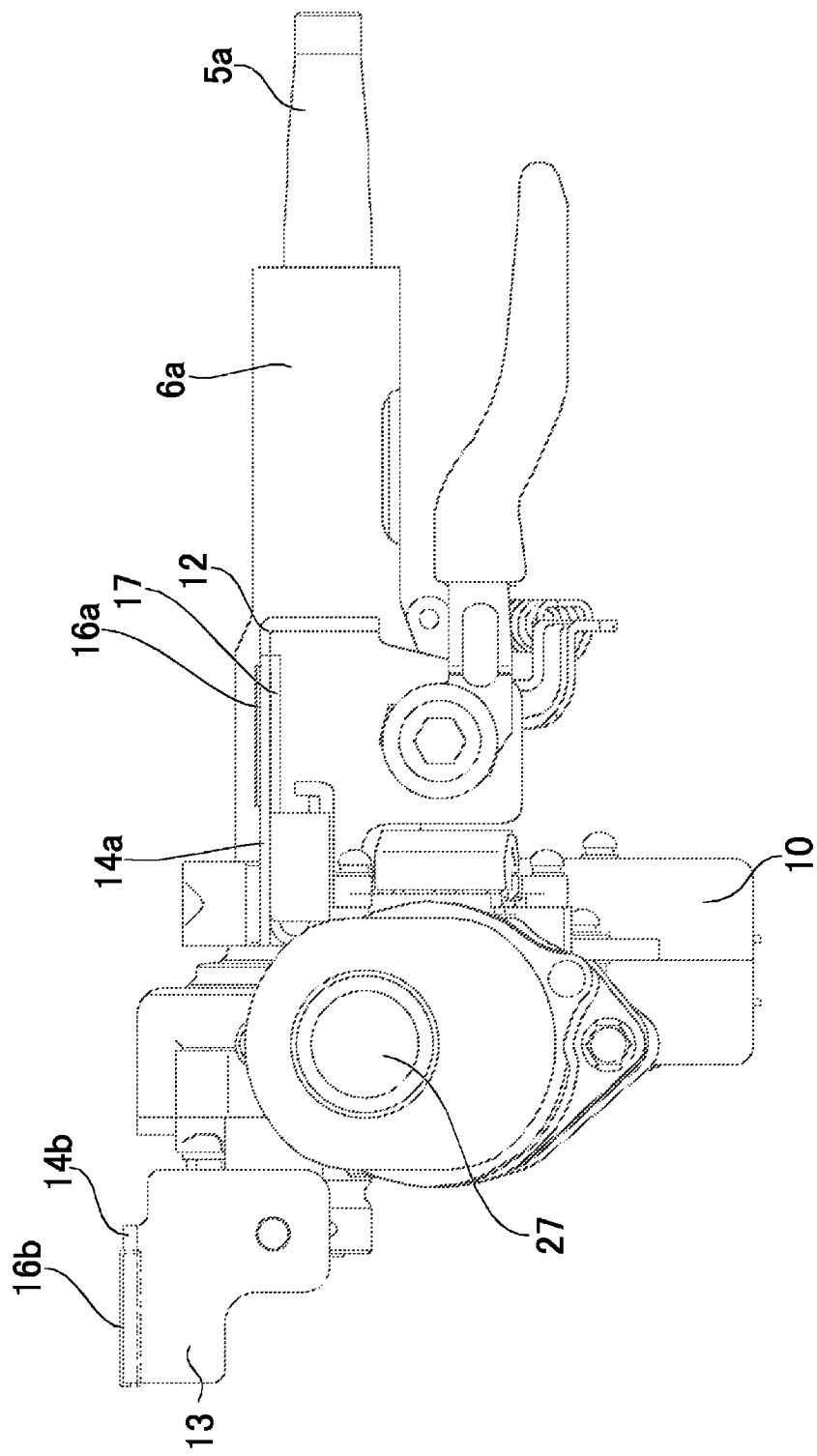
FIG. 35 is a side view of the same state of the apparatus illustrated in FIG. 34.
Figure 36:
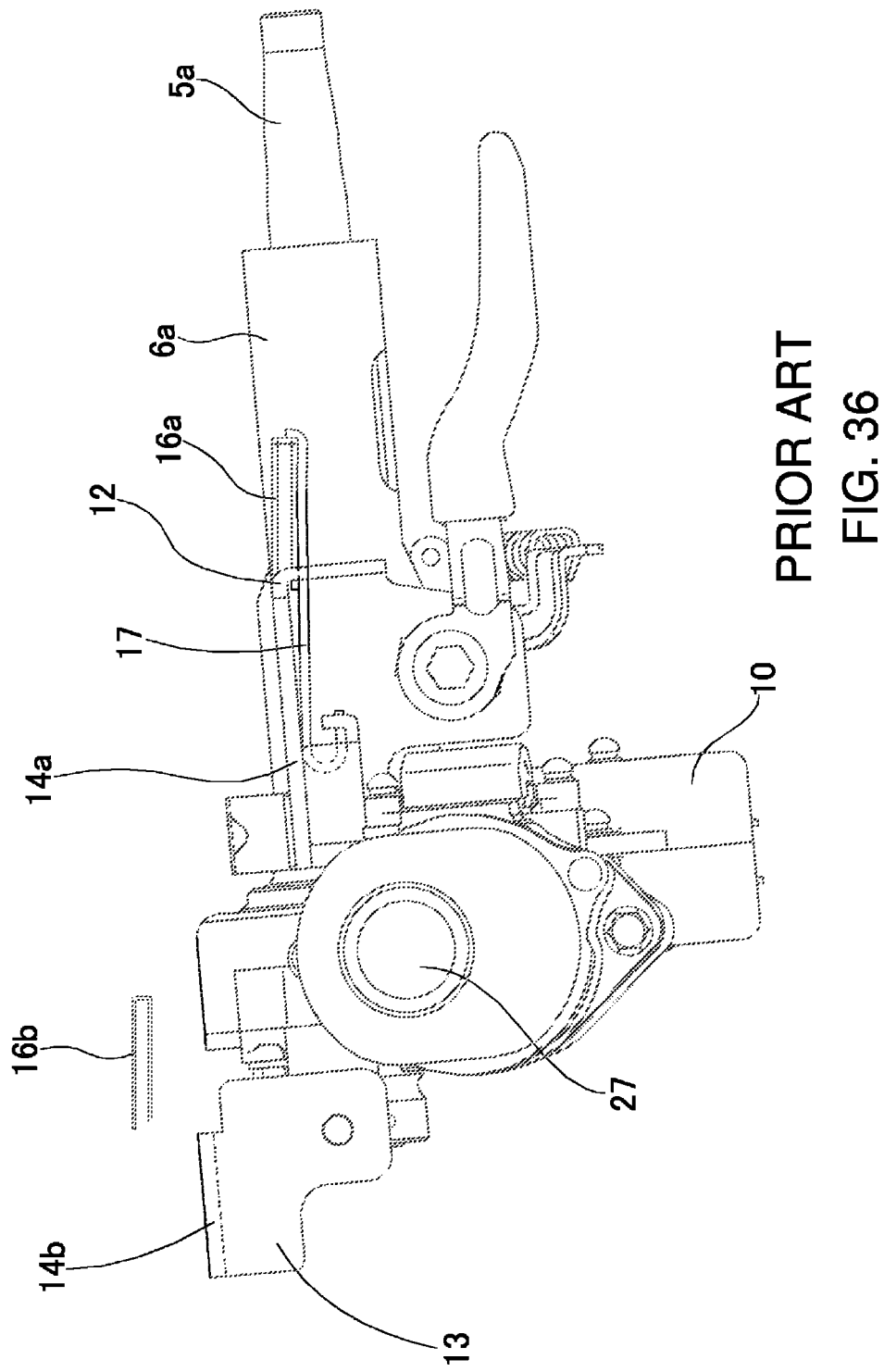
FIG. 36 is a side view of an example of a conventional steering support apparatus, and illustrates the state in which the steering column has displaced in the forward direction due to a secondary collision.
Figure 37:
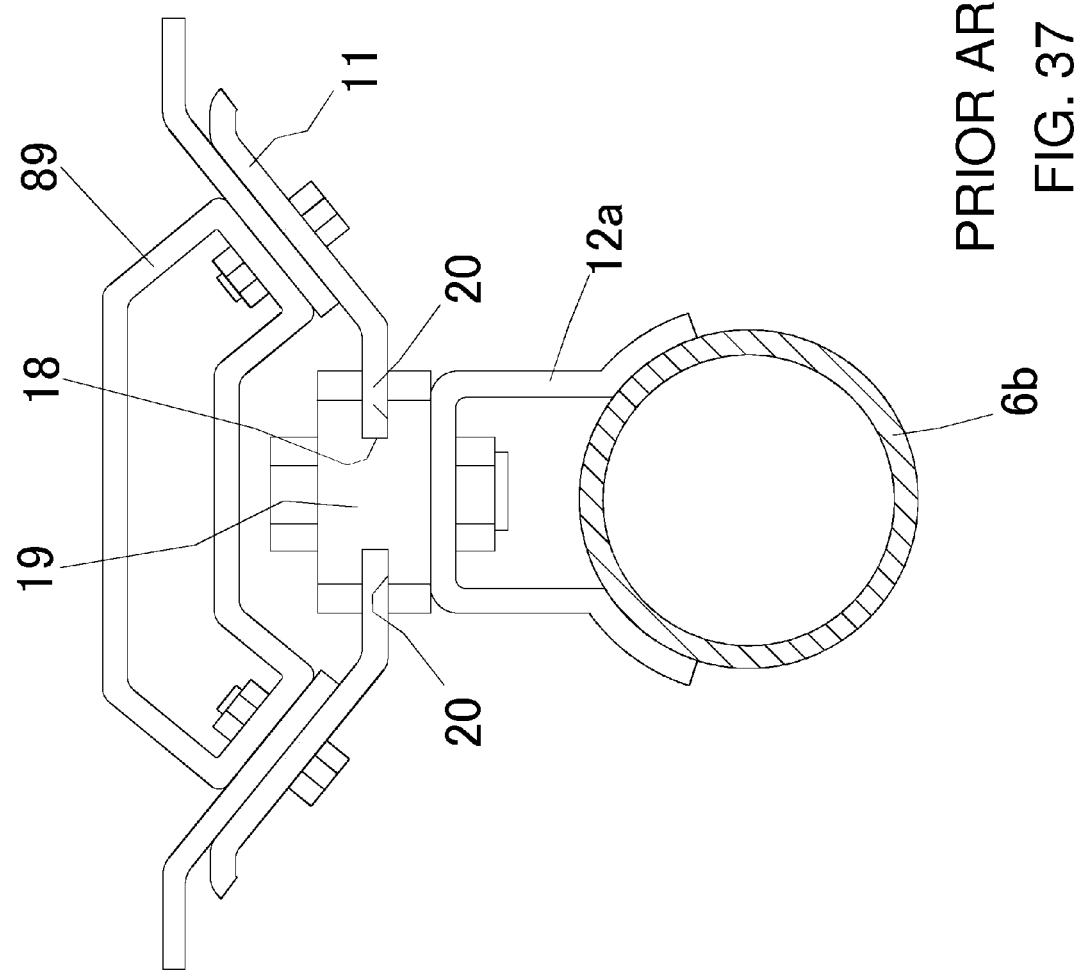
FIG. 37 is a cross-sectional view illustrating an example of conventional construction, and illustrates a virtual plane that exists in a direction that is orthogonal to the center axis of the steering column.
Figure 38:
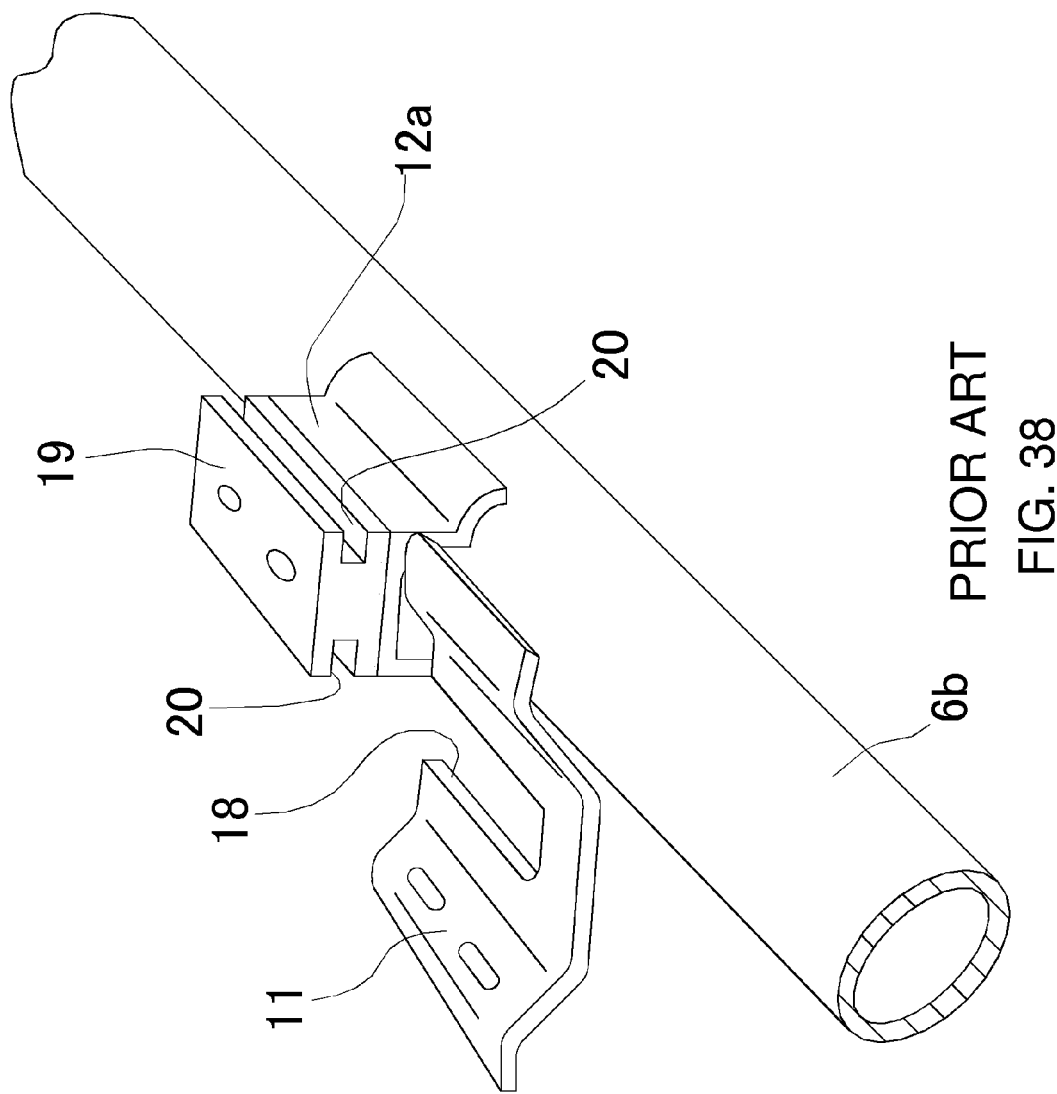
FIG. 38 is a perspective view of the construction illustrated in FIG. 37 and illustrates the state of connecting the bracket on the vehicle side and the bracket on the column side.
Figure 39:
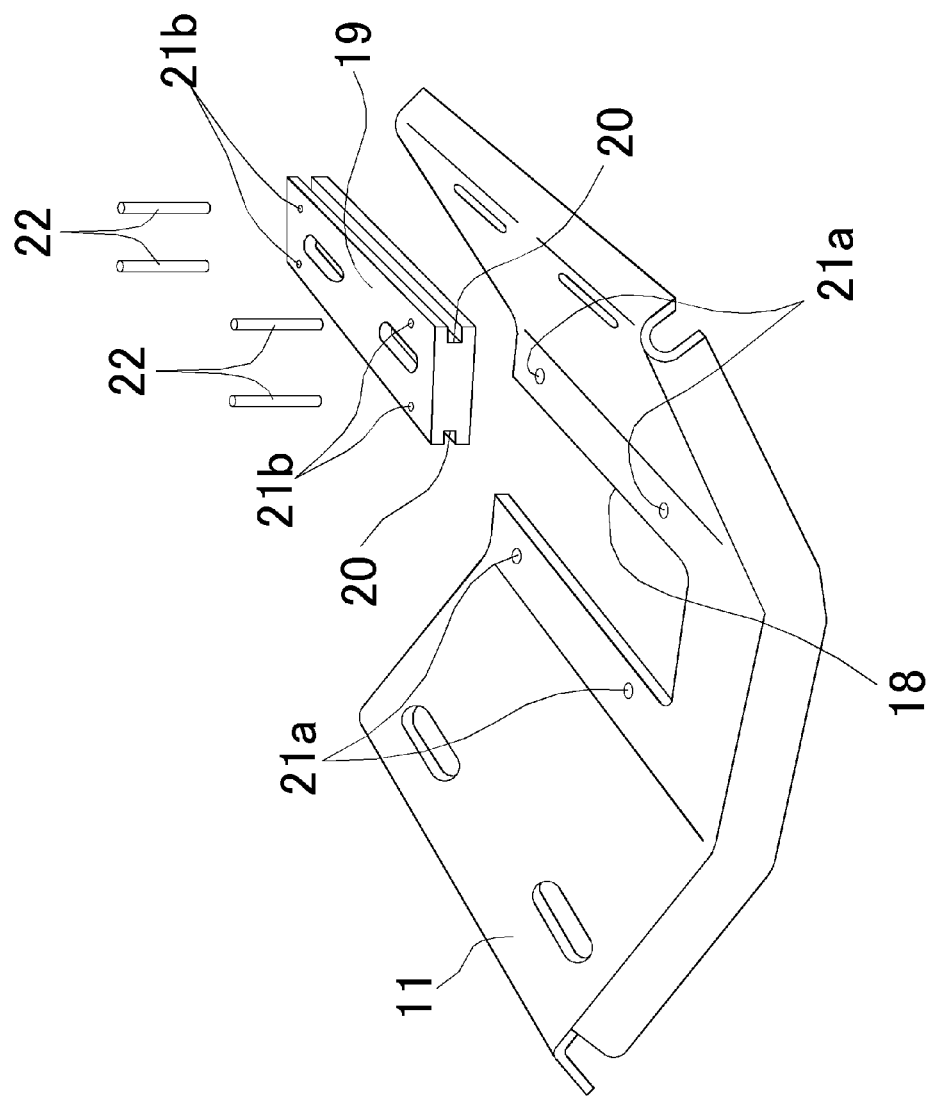
FIG. 39 is a perspective view of the construction illustrated in FIG. 37 with the steering column omitted and connecting pins depicted.

FIG. 1 to FIG. 8 illustrate a first embodiment of a first embodiment of the present invention. This embodiment illustrates the case of applying the present invention to a tilting and telescopic type steering apparatus that comprises both a tilting mechanism for adjusting the up/down position of the steering wheel 1 (see FIG. 33) and a telescopic mechanism for adjusting the forward/backward position of the steering wheel 1.

In order to construct a telescopic mechanism, a telescopic shaped steering column 6c that can expand or contract along the entire length by fitting the rear section of an inner column 23 on the front side inside the front section of an outer column 24 on the rear side is used. A steering shaft 5b is supported in the inner diameter side of this steering column 6c such that it can rotate freely, however, this steering shaft 5b as well is constructed such that by a male spline section that is formed on the rear section of a circular rod shaped inner shaft that is located on the front side engaging with a female spline section that is formed on the front section of a cylindrical shaped outer shaft 25 that is located on the rear side, the steering shaft 5b can transmit torque as well as expand and contract. With the rear end section of the outer shaft 25 protruding further toward the rear than the opening on the rear end of the outer column 24, the outer shaft 25 is supported on the inner diameter side of the outer column 24 by a bearing such as a single-row deep groove ball bearing 26 or the like that is capable of supporting both a radial load and thrust load such that only the rotation is possible. A steering wheel 1 is supported by and fastened to the rear end section of the outer shaft 25. When adjusting the forward/backward position of this steering wheel 1, the outer shaft 25 and the outer column 24 displace in the forward or backward direction, and the steering shaft 5b and steering column 6c expand or contract.

A housing 10a for housing a reduction gear and the like of an electric power steering apparatus is connected and fastened to the front end section of the inner column 23 of this steering column 6c. An electric motor 27, which is the auxiliary power source for the electric power steering apparatus, and a controller 28 for controlling the flow of electricity to this electric motor 27 are fastened to and supported by the top surface of the housing 10a. In order to construct the tilting mechanism, the housing 10a is supported by the vehicle body such that it can swivel around a horizontal shaft. In order for this, a support cylinder 29 is provided in the left/right direction on the upper front end of the housing 10a, and the front end section of the steering column 6c is supported by the vehicle body by a horizontal shaft such as a bolt that is inserted through a center hole 30 in the support cylinder 29 such that the rear section of this steering column 6c can swivel in the raising or lowering direction.

The inner diameter of the front half of the outer column 24 which constitutes the middle section and rear section of the steering column 6c can expand or contract elastically. In order for this, a slit 31 is formed in the axial direction on the bottom surface of the outer column 24. The front end section of this slit 31 opens up to a through hole 81 in the circumferential direction (see FIG. 24) that is formed on the edge of the front end of the outer column 24 or in the portion near the front end section of the outer column 24 except the top end section. A pair of thick plate-shaped supported plate sections 32 is located in the portion between both sides in the width direction of the slit 31. These supported plate sections 32 displace together with the outer column 24 when adjusting the position of the steering wheel 1, and function as support brackets on the displacement side.

In the case of this example, the supported plate sections 32 are supported by a bracket 33 on the column side such that adjustment of the up/down position and forward/backward position is possible. This bracket 33 on the column side is normally supported by the vehicle body, however, during a collision accident, it breaks away in the forward direction due to the impact of a secondary collision, which allows displacement in the forward direction of the outer column 24. In order for this, the bracket 33 on the column side is supported by a bracket 11a on the vehicle side such that it can break away in the forward direction due to an impact load that is applied during a secondary collision.

The adjustment section of the tilting mechanism and telescopic mechanism is constructed by firmly holding the supported plate sections 32 by a pair of left and right support plate sections 34 of the bracket 33 on the column side. Long holes 35 in the up/down direction having a partial arc shape that are centered around the horizontal shaft that supports the support cylinder 29 with respect to the vehicle body are formed in these support plate sections 34, and long holes 36 in the forward/backward direction that are long in the axial direction of the outer column 24 are formed in the supported plate sections 32. An adjustment rod 37 is inserted through these long holes 35, 36. A head section 38 that is located on the base end section (right end section in FIG. 3) of this adjustment rod 37 engages with the long hole 35 in the up/down direction that is formed in one of the support plate sections 34 (right support plate section in FIG. 3) to prevent rotation, and only allows displacement along this long hole 35 in the up/down direction. On the other hand, a cam apparatus 42 having a driving cam 40 and a driven cam 41 is provided between the nut 39 that is screwed onto the tip end section (left end section in FIG. 3) of the adjustment rod 37 and the outside surface of the other support plate section 34 (left support plate section in FIG. 3). Of these cams, the driving cam 40 can be rotated and driven by an adjustment lever 43.

When adjusting the position of the steering wheel 1, the driving cam 40 is rotated and driven by rotating the adjustment lever 43 in a specified direction (downward), shortening the dimension in the axial direction of the cam apparatus 42. This widens the space between the inside opposing surfaces of the driven cam 41 and the head section 38, and releases the holding force that the support plate sections 34 on both sides apply to the supported plate sections 32. At the same time, the inner diameter of the portion on the front section of the outer column 24 in which the rear section of the inner column 23 is fitted elastically expands, which lowers the contact pressure that acts in the area of contact between the inner circumferential surface on the front section of the outer column 24 and the outer circumferential surface on the rear section of the inner column 23. In this state, the up/down position and the forward/backward position of the steering wheel 1 can be adjusted within the range in which the adjustment rod 37 can be displaced between the long holes 35 in the up/down direction and the long holes 36 in the forward/backward direction.

After the steering wheel 1 has been moved to a desired position, the dimension in the axial direction of the cam apparatus 42 is expanded by rotating the adjustment lever 43 in the opposite direction (upward) of the specified direction above. As a result, the space between opposing inside surfaces of the driven cam 41 and the head section 38 is shortened, and the supported plate sections 32 are held firmly on both sides by the support plate sections 34. At the same time, the inner diameter of the portion on the front section of the outer column 24 in which the rear section of the inner column 23 is fitted elastically contracts, and the contact pressure acting at the area of contact between the inner circumferential surface of the front section of the outer column 24 and the outer circumferential surface of the rear section of the inner column 23 increases. In this state, the steering wheel 1 is held in the adjusted up/down and forward/backward positions.

In this embodiment, in order to increase the supporting force for holding the steering wheel 1 in the adjusted position, friction plate units 44 are held between the inside surfaces of the support plate sections 34 and the outside surfaces of the supported plate sections 32. These friction plate units 44 are formed by alternately overlapping one or a plurality of first friction plates having long holes that are aligned with the long holes 35 in the up/down direction, and one or a plurality of second friction plates having long holes that are aligned with the long holes 36 in the forward/backward direction. The detailed construction and function of this kind of friction plate unit 44 is known (JP2007-69821(A) and JP2008-

100597(A)), and is not related to the gist of the present invention, so a detailed drawing and explanation are omitted.

Furthermore, the bracket 33 on the column side breaks away in the forward direction with respect to the bracket 11a on the vehicle side due to the impact load of a secondary collision, however, is supported so that it cannot drop downward even as the secondary collision advances. The bracket 11a on the vehicle side is fastened to and supported by the vehicle body and does not displace in the forward direction during a secondary collision, and this bracket is formed by punching and bending of metal plate, such as steel plate, having sufficient strength and rigidity.

In this example, the bracket 11a on the vehicle side comprises a flat installation plate section 69, and a bent section 70 that is bent downward and formed around the entire edge of this installation plate section 69 except for the edge on the front end, this bent section improving the bending rigidity. A locking hole (locking notch) 45 that extends in the axial direction of the steering column 6c and that is open on the edge of the front end is formed in the center section in the width direction of the bracket 11 on the vehicle side, and a pair of installation holes 46 is formed in the rear section of the bracket 11a on the vehicle side such that the installation holes 46 are on both the left and right sides of the locking hole 45. The locking hole 45 is covered by a locking capsule 47, and is formed so as to extend near the rear end section of the bracket 11a on the vehicle side. This bracket 11a on the vehicle side is supported by and fastened to the vehicle body by bolts or studs that are inserted through the installation holes 46. In this example, the locking hole 45 is formed as a notch that is open on the front edge, however, the shape of the locking hole 45 is not limited to this, and construction is also possible in which the locking hole is formed as a closed hole that extends in the axial direction of the steering column being closed on the front edge, and that is capable of preventing the locking capsule 47 from dropping from the bracket 11a on the vehicle side.

The bracket 33 on the column side is connected to the bracket 11a on the vehicle side by way of the locking capsule 47 such that it is able to break away in the forward direction during a secondary collision. This locking capsule 47 is formed by plastic working such as forging of an iron alloy such as mild steel, die casting a light alloy such as an aluminum alloy or magnesium alloy, or injection molding of a high strength high functional polymer such as polyacetal. The width dimension in the left and right direction and the length dimension in the forward and backward direction are larger in the upper half section (top section) than in the lower half section (base section), and a flange section 48 that protrudes toward both sides and toward the rear is formed on the upper half section of the locking capsule 47 on the surfaces of both the left and right sides and the rear. Particularly, in this example, the shape of the lower half section of the locking capsule 47 which is a locked section which is locked in the locking hole 45 is a trapezoidal shape in which the edges of both the left and right sides from the middle section to the rear section in the forward/backward direction thereof are inclined in the direction such that the width dimension becomes smaller going toward the rear. In other words, the shape of the locking capsule 47 has left and right symmetry, however, the edges of both the left and right sides from the middle section of the lower half section to the rear end section are sloped in opposite directions from each other with respect to the forward/backward direction. In addition to the construction described above, a locking capsule that comprises an upper half section, a middle section in the up/down direction and a lower half section, with the shape of the middle section, which is the locked section, being a trapezoidal shape in which the distance between locking grooves that are formed on the surfaces of both the left and right sides is inclined in the direction where the width dimension becomes smaller going toward the rear can be employed for this locking capsule (see FIG. 26B).

When this kind of locking capsule 47 is locked in (fitted inside) the locking hole 45 that is formed in the bracket 11a on the vehicle side, the locking capsule 47 is supported by the bracket 11a on the vehicle side such that it can break away in the forward direction due to an impact load that is applied during a secondary collision. In this example, the rear half section of the locking hole 45 has nearly the same shape as the lower half section of the locking capsule 47. In other words, at least the edges on the left and right sides of the rear half section of this locking hole 45 are sloped in a direction toward each other going toward the rear. However, the width dimension of the locking hole 45 is a little larger, for example about 0.5 to 2 mm larger than the width dimension of the portion of the lower half section of the locking capsule 47 where the forward/backward position coincides with the combined state illustrated in FIG. 5. Moreover, small notch sections 55 are formed at a plurality of locations (eight locations in the example in the figure) in the inside edge section of the locking hole 45. These small notch sections 55, as illustrated in FIG. 8A, are open toward the inside of the locking hole 45. Furthermore, small through holes 49a are formed in part of the flange section 48 of the locking capsule in portions that are aligned with these small notch sections 55.

In this example, a pair of left and right small through holes 49b are formed in the portions of the flange section 48 of the locking capsule 47 that are separated from the small notch sections 55. Similar small through holes (not illustrated in the figure) are also formed in the portions of the bracket 11a on the vehicle side that are aligned with these small through holes 49b. Connecting pins are formed to span between the small through holes 49b in the locking capsule 47 and the small through holes in the bracket 11a on the vehicle side by performing injection molding to inject synthetic resin in these aligned holes. Alternatively, connecting pins 50 can be formed to span these through holes, by pressure fitting pins made of synthetic resin or light metal alloy inside these small through holes. In either case, part of these connecting pins 50 enters the space between the top and bottom surfaces of the bracket 11a on the vehicle side and the bottom surface of the flange section 48 and the top surface of the bracket 33 on the column side, which are opposing surfaces to the top and bottom surfaces of the bracket 11a on the vehicle side, performing part of the function of eliminating vibration in the installation section between the bracket 11a on the vehicle side and the bracket 33 on the column side.

The locking capsule 47 is connected and fastened to the bracket 33 on the column side by a plurality of rivets 54 (three rivets in the example in the figure) such that they do not separate even though an impact load is applied. In this example, the assembly height is suppressed by using rivets 54, however, when considering the assembly height is not necessary, a plurality of bolts and nuts can be used to connect and fasten the members instead of rivets 54. The locking capsule 47 in which small through holes 49a are formed in the flange section 48 of the upper half section thereof and that is connected and fastened to the bracket 33 on the column side by rivets 54, and the bracket 11a on the vehicle side in which small notch sections 55 and small through holes are formed, are connected together by synthetic resin such that they can be separated due to an impact load that is applied during a secondary collision. In other words, synthetic resin 56 that is made of a thermoplastic resin or the like, is injected in the molten state by injection molding between the small notches 55 and small through holes that are formed in the bracket 11*a* on the vehicle side and the small through holes 49*a*, 49*b* that are formed in the locking capsule 47 so as to span between the bracket 11*a* on the vehicle side and the flange section 48. When doing this, the lower half section of the locking capsule 47 is positioned in the center section in the width direction of the locking hole 45 so that there is a small space 57 along the entire length between the edges on the left and right sides of the lower half section and the inside edges of the locking hole 45, including the portion between the rear end section of the locking hole 45 and the lower half section of the locking capsule 47.

Figure 1:
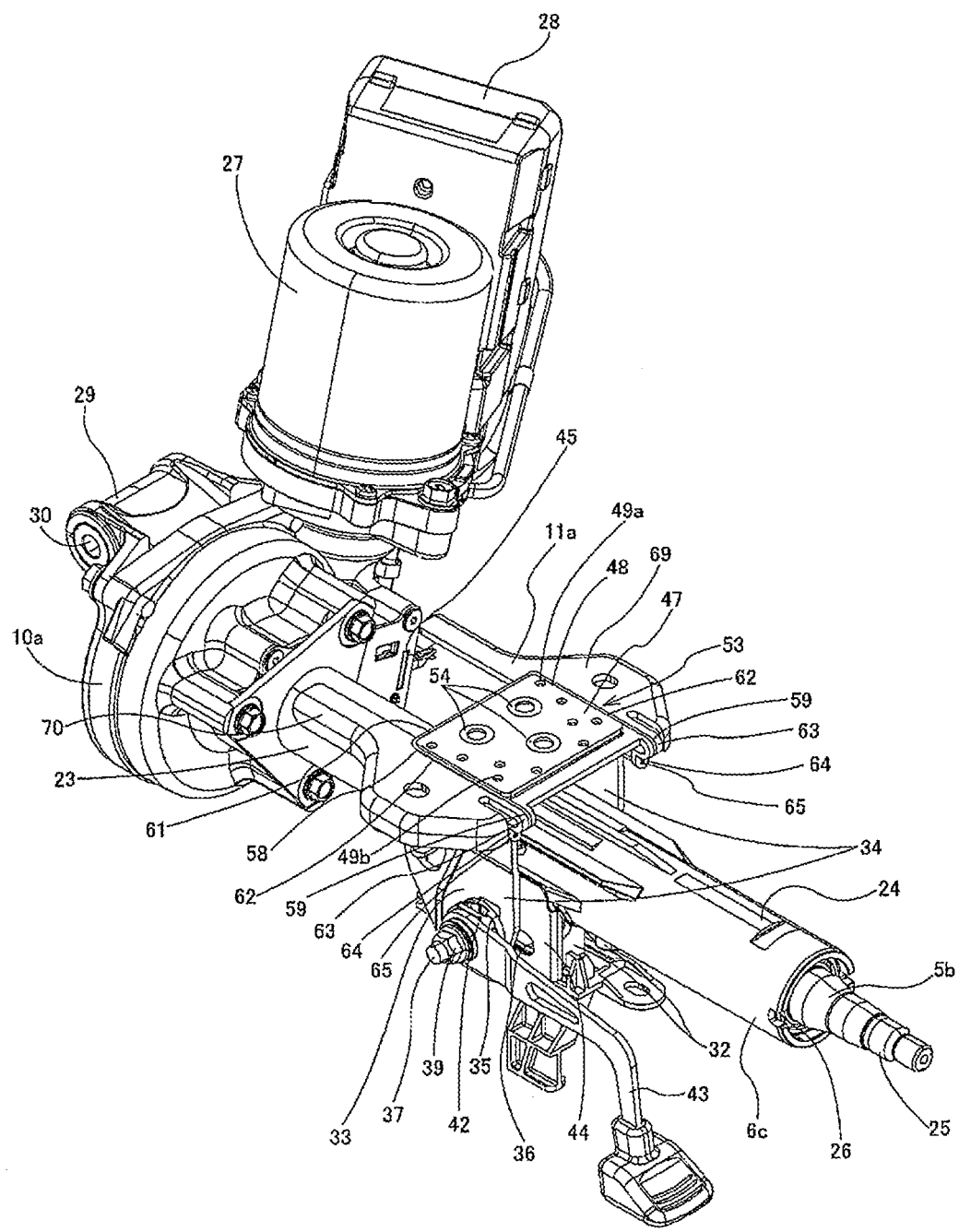
FIG. 1 is a perspective drawing illustrating a first example of a first embodiment of the present invention, and illustrates the state as seen from the upper rear.
Figure 2:
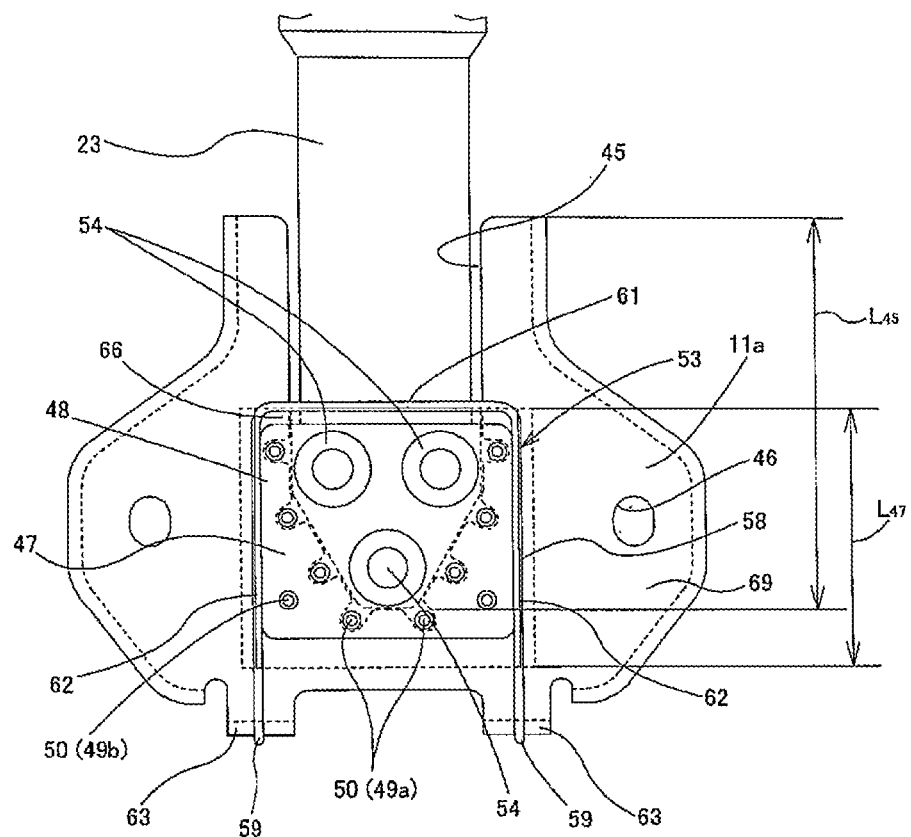
FIG. 2 is a top view illustrating the state as seen from above the center section in FIG. 1
Figure 3:
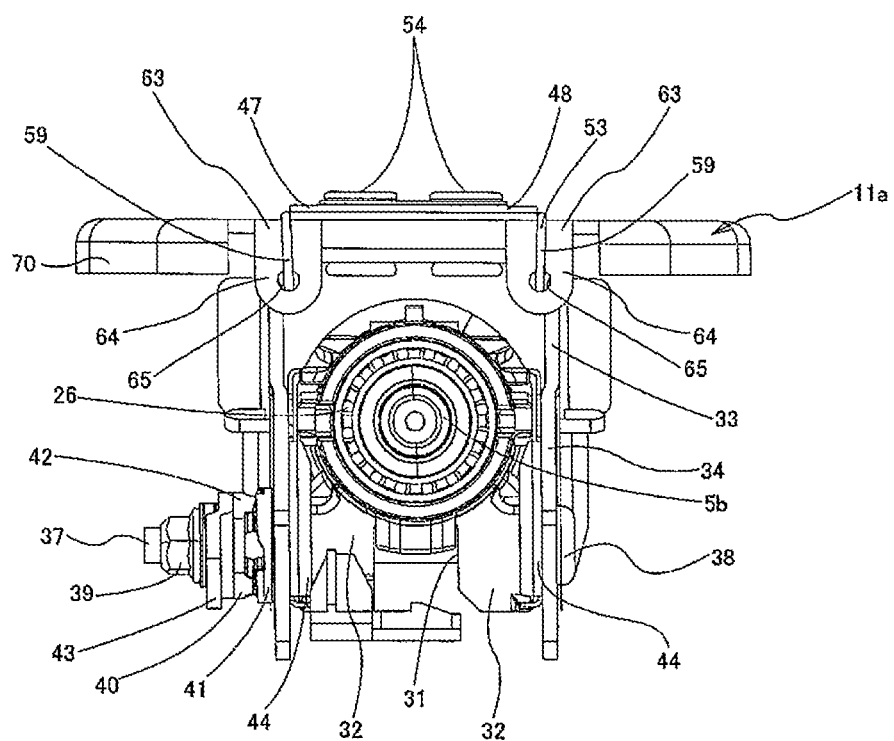
FIG. 3 is an end view as seen from the bottom in FIG. 2.
Figure 4:
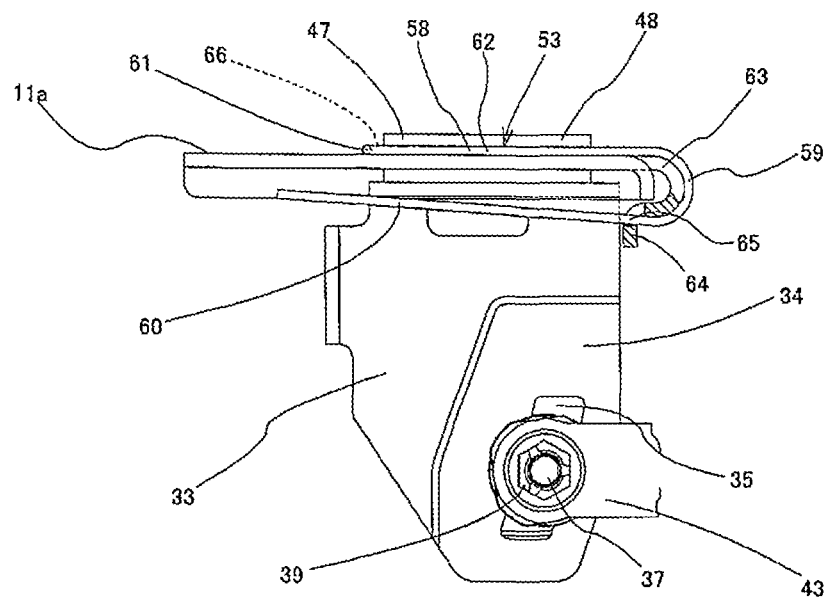
FIG. 4 is a partial cross-sectional side view as seen from the left in FIG. 3.
Figure 5:
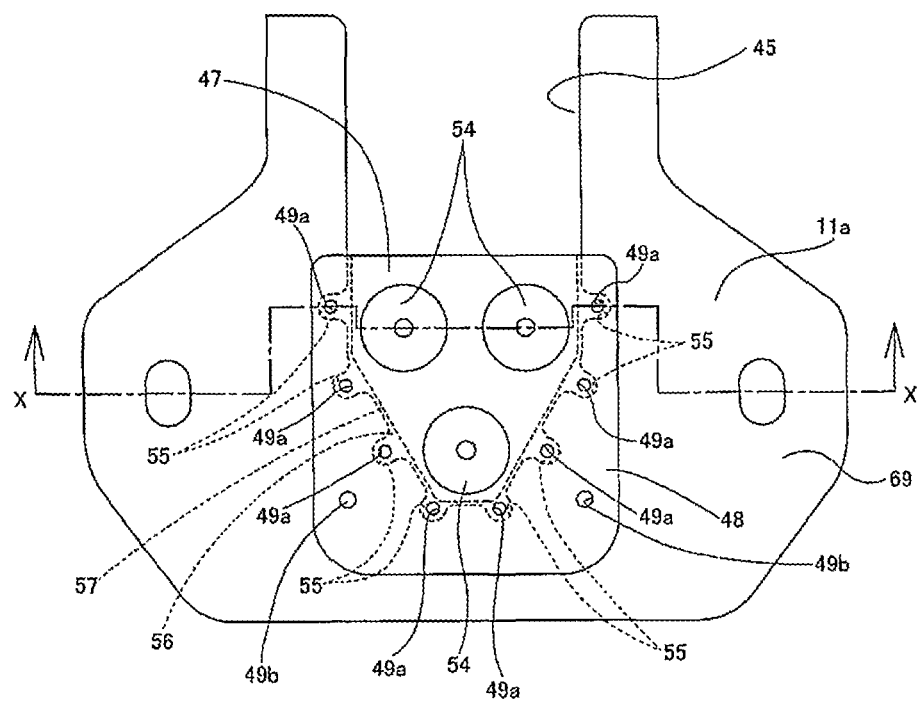
FIG. 5 is a drawing for explaining the state of filling synthetic resin for the connecting member for connecting the bracket on the vehicle side and the locking capsule, and is a top view that is similar to FIG. 2.
Figure 6:
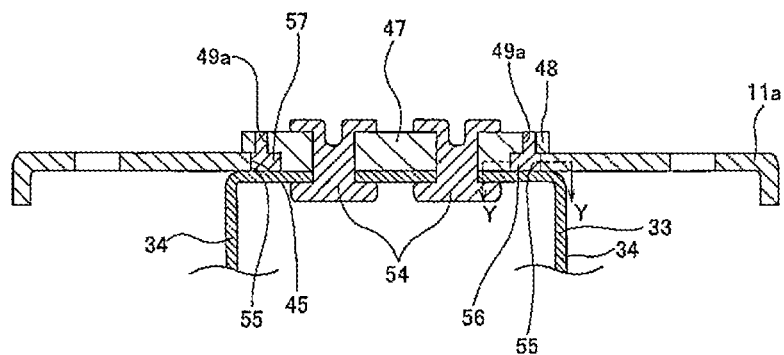
FIG. 6 is a cross-sectional view of section X-X in FIG. 5.
Figure 7:
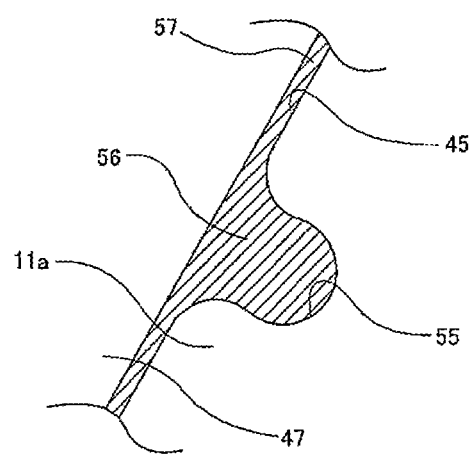
FIG. 7 is an enlarged cross-sectional view of section Y-Y in FIG. 6.
Figure 8:
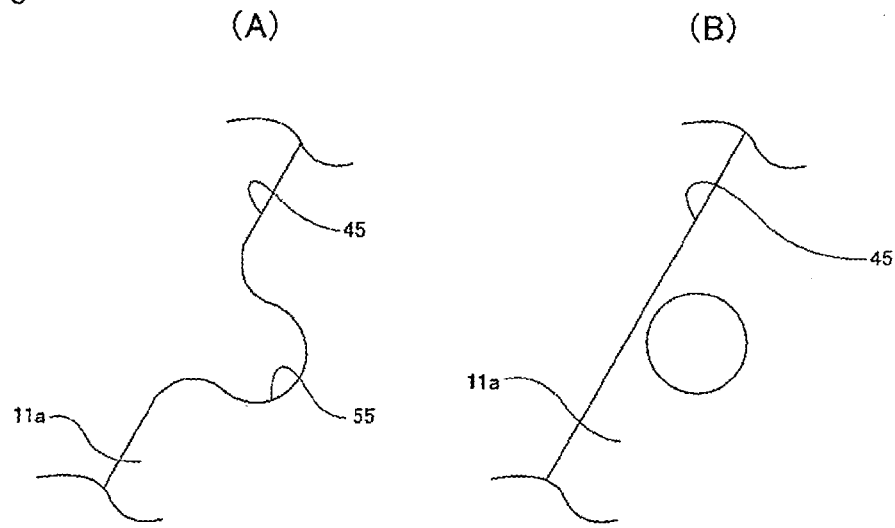
FIG. 8A is a partial top view illustrating a small notch section of the preferred construction.
FIG. 8B is a top view illustrating a small through of construction that is different than the preferred construction.

The synthetic resin 56 is fed into the small notch sections 55 by way of the small through holes 49*a*, however, these small notch sections 55 are open to the inside of the locking hole 45. Therefore, synthetic resin smoothly flows from the small notch sections 55 into the small space 57, and as illustrated in FIG. 7, the synthetic resin 56 that is fed into these small notch sections 55 penetrates into the small space 57 along the entire length, then cools and solidifies. When compared with construction such as illustrated in FIG. 8B where small through holes that are independent of the locking hole 45 are formed in part of the bracket 11*a* on the vehicle side, in the case of the this embodiment, the small notch sections 55 are open to the inside of the locking hole 45 as illustrated in FIG. 8A, so it is possible to feed a sufficient amount of synthetic resin 56 into the small space 57. However, alternatively employing construction such as illustrated in FIG. 8B instead of the construction of this invention is also included within the scope of the present invention.

The part of the synthetic resin 56 that is cooled and solidified in a state spanning between the small through holes 49*a* and small notch sections 55 forms the connecting pins 50, which are the plurality of connecting members of the present invention. As a result, the locking capsule 47 is connected to and supported by the bracket 11*a* on the vehicle side such that the locking capsule 47 can displace in the forward direction due to an impact load that is applied during a secondary collision. Furthermore, part of the synthetic resin 56 that is fed into the small notch sections 55 penetrates into the small space that exists between the top and bottom surfaces of the bracket 11*a* on the vehicle side and the opposing surfaces, which are the bottom surface of the flange section 48 and the top surface of the bracket 33 on the column side, then cools and solidifies. As a result, it is possible to eliminate vibration in the installation section of the bracket on the column 33 to the bracket 11*a* on the vehicle side, and thus it is possible to improve the operational feel of the steering wheel 1. Moreover, of the top and bottom surfaces of the bracket 11*a* on the vehicle side and the opposing surfaces, which are the bottom surface of the flange section 48 and the top surface of the bracket 33 on the column side, it is possible to bring one of the sets of surfaces in contact with other, and have only a small space between the other set of surfaces, such that part of the synthetic resin penetrates into that space.

In the present invention, in order to connect the locking capsule 47 to the bracket 11*a* on the vehicle side, it is not absolutely necessary to form connecting members such as pins that are pressure fitted, or connecting pins that are formed by injection molding of synthetic resin. For example, it is possible to connect the bracket 11*a* on the vehicle side and the locking capsule 47 by pressure fitting the lower half section or the middle section (locking groove portion) of the locking capsule 47 into the locking hole 45 of the bracket 11*a* on the vehicle side, and in this case as well, it is possible to apply other construction of the present invention.

In this example, an energy absorbing member 53 is provided between the locking capsule 47 and the bracket 11*a* on the vehicle side, which are combined together as described above. This energy absorbing member 53 is formed by bending a plastically deformable wire such as low carbon steel wire, and comprises one base section 58 and a pair of bent back sections 59 and a pair of extending sections 60, left and right respectively. Of these, the base section 58, when viewed from above, has a U shape that is open toward the rear, and comprises a straight locking edge section that is located in the front end section, and a pair of left and right side edge sections that are bent at right angles and extend from the left and right end sections of the locking edge section 61 toward the rear. The bent back sections 59 are formed such that the portions that extend from the rear end sections of the side sections 62 are bent downward and toward the front at 180-degree angles. Furthermore, the pair of extending sections 60 extend toward the front from the tip end sections (front end sections on the bottom side) of the bent back sections 59. In this example, the lengths of these extending sections 60 in the normal state before plastic deformation that occurs during a secondary collision are long enough that the tip end sections are located further toward the front than the locking edge section 61 in a range such that they do not interfere with other members.

In order to mount this kind of energy absorbing member 53, a partial cylindrical shaped convex surface 63 is formed at two locations that are separated from each other in the width direction on the rear end section of the metal plate of the bracket 11*a* on the vehicle side by bending part of the rear end edge of the bracket 11*a* on the vehicle side. In other words, in this example, tab shaped protruding sections that are formed such that they protrude further than the portions on both sides in width direction are bent back at nearly 180 degrees to form the convex surfaces 63, the tip ends of these convex surfaces are bent downward at nearly 90 degrees to form a pair of hanging plate sections 64. Small through holes 65 are formed in each of these hanging plate sections 64. The inner diameter of these small through holes 65 is a little larger than the outer diameter of the extending sections 60, so that these extending sections 60 can be passed through these small through holes 65.

As illustrated in FIG. 1 to FIG. 4, the energy absorbing member 53 spans between the locking capsule 47 and the bracket 11*a* on the vehicle side. In other words, the base section 58 is fitted so that it wraps around the section located on the upper half section of the locking capsule 47 that protrudes from the top surface of the bracket 11*a* on the vehicle side, and the extending sections 60 are inserted from the rear toward the front into the small through holes 65. In this example, in the normal state, there is a space 66 between the rear edge of the locking edge section 61 of the base section 58 and the front surface of the upper section of the locking capsule 47. During a secondary collision, this locking capsule 47 moves freely toward the front the amount of the dimension in the forward/backward direction of this space 66, and after the energy absorbing member 53 has moved without plastically deforming, this energy absorbing member 53 begins to plastically deform. The reason for this is that by staggering the timing when the locking capsule 47 begins to displace in the forward direction by casing the connecting members made of synthetic resin 56 to shear, and the timing when the energy absorbing member 53 begins to plastically deform, the impact applied to the body of the driver is further lessened at the instant when a secondary collision occurs.

In this example, the length $L_{45}$ in the forward/backward direction of the locking hole 45 that locks the locking capsule 47 that displaces in the forward direction together with the outer column 24 during a secondary collision in this way is sufficiently larger than the length $L_{47}$ in the same direction of the locking capsule 47 ($L_{45} \gg L_{47}$). In the case of this embodiment, the length $L_{45}$ of the locking hole 45 is kept at two times greater or more than the length $L_{47}$ of the locking capsule 47 ($L_{45} \geqq 2L_{47}$). During a secondary collision, even when the locking capsule 47 has displaced completely forward together with the outer column 24, or in other words, even when the locking capsule 47 has stopped displacing in the forward direction due to the impact load that was applied from the steering wheel 1, the portion of at least the rear end section of the flange section 48 of the locking capsule that is capable of supporting the weight of the steering column 6c and bracket 33 on the column side does not come out completely from the locking hole 45. That is, even when the secondary collision has advanced, the rear end section of the flange section 48 that is formed on the upper half section of the portions on both sides in the width direction of the locking capsule 47 is positioned on the top side of the front end section of the bracket 11a on the vehicle side, and is able to prevent the locking capsule 47 from dropping down. As was described above, even when the locking hole is formed as a closed hole that is not open on the front edge, the locking capsule 47 is prevented from dropping down from the bracket 11a on the vehicle side.

Furthermore, a pair of left and right protruding sections that protrude further outward in the outward direction than the outside surfaces on the left and right of the bracket 33 on the column side are formed on part of the bracket on the column side 33, and part of the edges on the top ends of these protruding sections can be such that they closely face part of the bottom surface of the bracket 11a on the vehicle side. As a result, when a moment around the axial direction is applied to the bracket 33 on the column side, the bracket 33 on the column side inclines a little, causing part of the edge on the top end of one of the protruding sections to come in contact with part of the bottom surface of the bracket 11a on the vehicle side, making it possible to prevent the bracket 33 on the column side from inclining more than this. With this construction, even though a moment is applied to the bracket 33 on the column side, the amount of relative displacement between the bracket 33 on the column side and the bracket 11a on the vehicle side is kept to a small amount, and it is possible to prevent a force from being applied to the bracket 33 on the column side and the bracket 11a on the vehicle side that could damage these members.

In the steering column support apparatus of this example, constructed as described above, tuning for stabilizing forward displacement of the steering wheel 1 during secondary collision is simplified by having engagement between the bracket 11a on the vehicle side and the locking capsule 47 at only the center section in the width direction of the bracket 11a on the vehicle side. This single locking capsule 47 is located in a portion directly above the outer column 24 in this way, so during a secondary collision, impact load that is applied from the steering wheel 1 to the locking capsule 47 by way of the outer shaft 25 and outer column 24 is uniformly applied to the locking pins 50 that are connecting members that connect the locking capsule 47 and the bracket 11a on the vehicle side, and is essentially applied to the center section of the locking capsule 47 in the axial direction of the outer column 24. A force is applied in a direction that causes the locking capsule 47 to come out in the forward direction from the locking hole 45, so the locking pins 50 that connect the locking capsule and bracket 11a on the vehicle side essentially shear at the same time. As a result, displacement in the forward direction of the outer column 24 that is connected to the locking capsule by way of the bracket 33 on the column side is performed stably without excessive inclination of the center axis.

Moreover, in this example, together with providing a tilt and telescopic mechanism, friction plate units 44 are provided in order to increase the holding force for holding the steering wheel 1 in an adjusted position. Providing the tile and telescopic mechanism and the friction plate unit 44, because of an accumulation of manufacturing error, easily become a cause for variation in the break away load during a secondary collision, however, in this example, through the engagement of the single locking capsule 47 and bracket 11a on the vehicle side it is possible to suppress this kind of variation in break away load. As a result, it is possible to perform proper tuning for lessening the impact applied to the body of the driver that collides with the steering wheel 1 during a secondary collision, making it possible to more completely protect the driver.

In addition, the length $L_{45}$ in the forward/backward direction of the locking hole that is formed in the bracket 11a on the vehicle side is sufficiently longer than the length $L_{47}$ in the forward/backward direction of the locking capsule 47, so even when a secondary collision has advanced, the locking capsule 47 is prevented from coming completely out in the forward direction from the locking hole 45, thus preventing the steering wheel 1 from dropping excessively. As a result, depending on the extent of the accident, this makes it possible to easily operate the steering wheel 1 even after an accident, when moving the vehicle that was in the accident to the side of the road.

Furthermore, the features of this example are:

(1) By placing an energy absorbing member 53, which is formed by bending wire, between the bracket 11a on the vehicle side and the locking capsule 47 that is connected and fastened to the bracket 33 on the column side, construction that absorbs impact energy and allows the locking capsule 47 to displace in the forward direction is achieved at low cost.

(2) By devising construction for connecting the bracket 11a on the vehicle side and the locking capsule 47, separation of the locking capsule 47 from the bracket 11a on the vehicle side during a secondary collision can be performed smoothly.

In other words, in the construction of this example, during the process of the locking capsule displacing in the forward direction with respect to the bracket 11a on the vehicle side, the energy absorbing member 53 plastically deforms. That is, as the locking capsule 47 displaces in the forward direction, the locking side section 61 of the base section 58 of the energy absorbing member 53 is pulled forward, and the front edges (inner edges) of the bent back sections 59 press again the convex surfaces 63. As the locking capsule 47 further displaces in the forward direction from this state, the base section 58 is pulled further in the forward direction and part of the energy absorbing member 53 catches on the convex surfaces 63 and plastically deforms. More specifically, as the bent back sections 59 move toward the tip end sections of the extending sections 60 while being caught on the convex surfaces 63, the locking capsule 47 is allowed to displace in the forward direction. By the locking capsule 47 moving in the forward direction while the energy absorbing member 53 plastically deforms in this way, impact energy that is applied to the locking capsule 47 from the steering wheel 1 by way of the outer shaft 25, ball bearing 26, outer column 24, adjustment rod 37, and bracket 33 on the column side is absorbed. Moreover, the impact that is applied to the body of the driver that collides with the steering wheel 1 is reduced, protecting the driver.

In this example, it is possible to keep material costs, processing costs and assembly costs of the energy absorbing member 53 low. In other words, with the construction of this example, a low cost material such as a low carbon steel wire can be used as the energy absorbing member, and the energy absorbing member 53 is formed by cutting and bending this material to the necessary length, so when compared with the case of punching and pressing metal plate, the yield of material can be increased nearly 100%. Moreover, bending the wire to a desired shape can also be performed easily when compared with the bending of metal plate. Furthermore, the work of assembling the energy absorbing member 53 having a desired shape in between the bracket 11a on the vehicle side and the locking capsule 47 can be performed easily. As a result, it is possible to reduce the cost of the energy absorbing steering apparatus in which the steering column support apparatus of the present invention is installed.

With the construction of this example, it is possible to keep the load required for causing the locking capsule 47, which is supported by the outer column 24 of the steering column 6c by way of the bracket 33 on the column side, to come out in the forward direction from the locking hole 45, which is formed in the bracket 11a on the vehicle side, low. In other words, in the construction of this example, synthetic resin 56 is filled into the small space 57 that exists between the inside edges of the locking hole 45 and the edges on both sides of the lower half section of the locking capsule 47, so direct rubbing between these surfaces can be prevented. Consequently, even when both the bracket 11a on the vehicle side and the locking capsule 47 are made of metal, there is no strong rubbing between metal surfaces as the lower half section of the capsule 47 comes out from the locking hole 45 during a secondary collision. Therefore, even when a large force is applied diagonally in the forward direction from the steering wheel 1 to the locking capsule 47, the locking capsule 47 can smoothly separate from the bracket 11a on the vehicle side with a light force, so it is possible to more completely protect the driver. In the case of this example, the shape of the lower half section of the locking hole 45 and the locking capsule 47 is such that the width dimension becomes smaller going to the rear, so it becomes even easier for the locking capsule 47 to come out from the locking hole 45, and thus it is possible to even more completely protect the driver during a collision accident. An apparatus comprised both or only one of the two features described above is included within the scope of the present invention.

Second Example of First Embodiment

Figure 9:
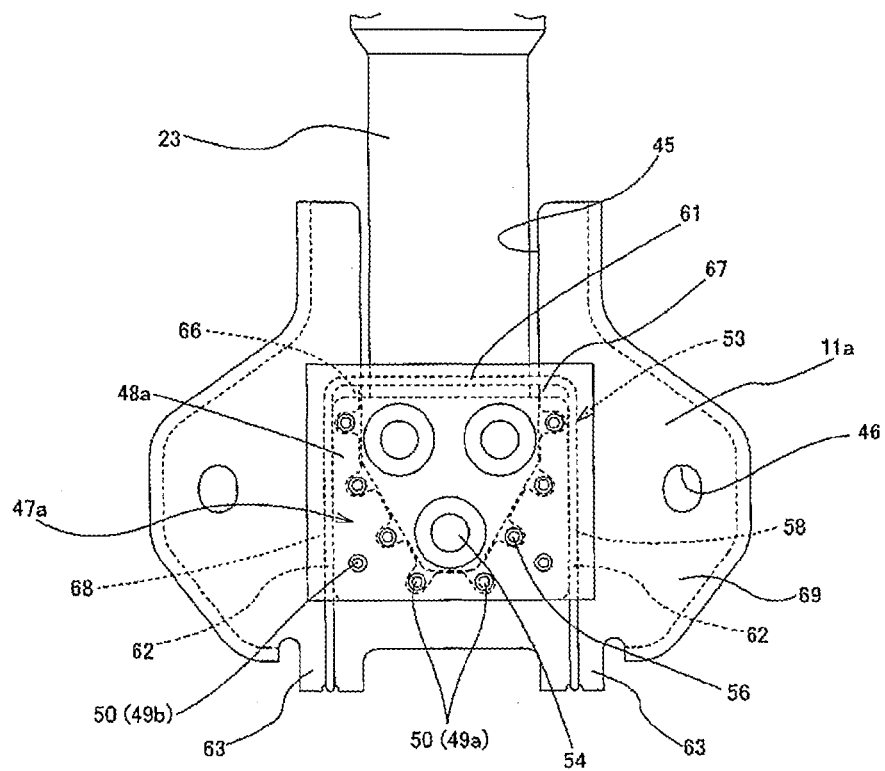
FIG. 9 illustrates a second example of the first embodiment of the present invention, and is similar to FIG. 2.
Figure 10:
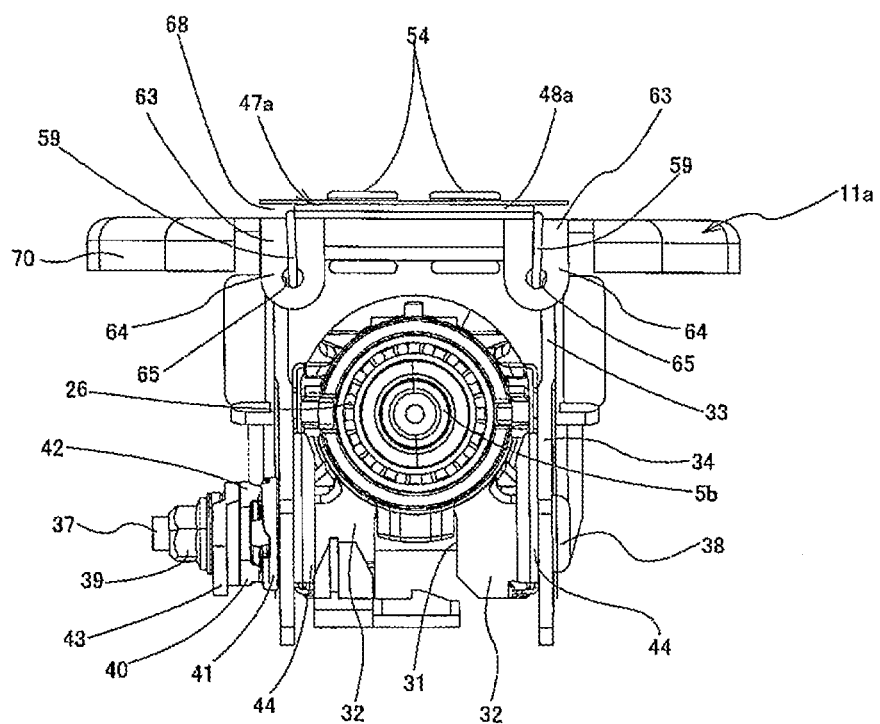
FIG. 10 is an end view as seen from below in FIG. 9.
Figure 11:
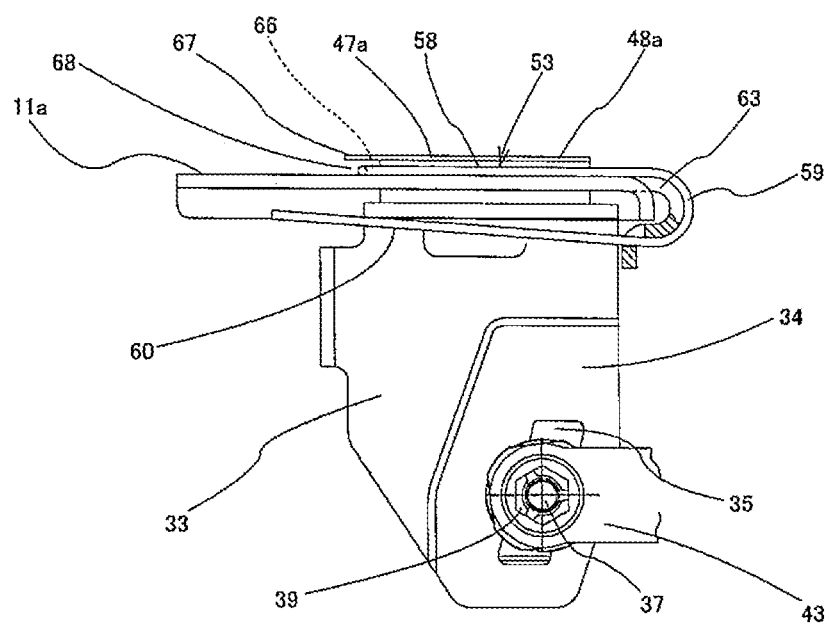
FIG. 11 is a partial cross-sectional view as seen from the left in FIG. 10.

FIG. 9 to FIG. 11 illustrate a second example of the first embodiment of the present invention. In this example, eave sections 67 that protrude further toward the front and to the sides than the underneath portion are provided on the front surface and the surfaces on the left and right sides of the flange section 48a that is formed on the upper half section of the locking capsule 47a. With the lower half section of the locking capsule 47a fitted in the locking hole 45 of the bracket 11a on the vehicle side, and the upper half section of the locking capsule 47a and the bracket 11a on the vehicle side connected by connecting members, which are locking pins 50 made of synthetic resin 56, a space 68 that is surrounded on three sides and that opens toward the front or to the sides is formed between the top surface of the bracket 11a on the vehicle side and the bottom surface of the eave sections 67.

As in the case of the first example of the first embodiment, the base section 58 of an energy absorbing member 53 having a U shape that is open toward the rear is located below the eave sections 67, or in other words inside the space 68. In this example as well, in the normal state, a space 66 is formed between the locking edge section 61 that is located on the front end section of the base section 58 and the front surface of the flange section 48a that is formed on the upper half section of the locking capsule 47a, which lessens the impact applied to the body of the driver at the instant when a secondary collision occurs.

In the case of the construction of this example, as the locking capsule 47a displaces in the forward direction with respect to the bracket 11a on the vehicle side due to a secondary collision, the base section 58 of the energy absorbing member 53 engages so as to wrap around the front surface and left and right side surfaces of the flange section 48, which is formed on the upper half section of the locking capsule 47, in the portion under the eave sections 67. By maintaining sufficient length dimensions for the pair of extending sections 60 of the energy absorbing member 53, it is possible to keep these extending sections 60 located on the top surface of the bracket 11a on the vehicle side even when the locking capsule 47a has displaced all the way forward as the secondary collision advanced. Furthermore, by sufficiently maintaining the length dimensions of these extending sections 60, it is possible for the tip end sections of these extending sections 60 to remain inside the small through holes 65.

As a result, even when the locking capsule 47a has come out all the way in the forward direction from the locking hole 45 in the bracket 11a on the vehicle side, it is possible to support the locking capsule 47a in a hanging state by the bracket 11a on the vehicle side by way of the energy absorbing member 53. Consequently, the steering wheel 1 that is supported by the locking capsule by way of the bracket 33 on the column side is prevented from dropping excessively. Therefore, as in the first example of the first embodiment, even when it is difficult to maintain the dimension in the forward/backward direction of the bracket 11a on the vehicle side, and it is not possible to maintain the forward/backward dimension (depth) of the locking hole 45, it is possible to prevent the steering wheel 1 from dropping excessively after a secondary collision, and depending on the extent of the collision accident, it is possible to easily operate the steering wheel 1 and move the vehicle that was in the accident to the side of the road.

Even when the dimension in the forward/backward direction of the bracket 11a on the vehicle side can be maintained, construction for preventing the locking capsule 47a from dropping can be a combination of engagement between the locking hole 45 and the locking capsule 47a, and engagement between the energy absorbing member 53 and the locking capsule 47a. By using two types of construction for preventing dropping of the locking capsule 47a in this way, it is possible to sufficiently maintain the support for supporting the steering wheel 1 after the secondary collision has advanced even without particularly increasing the rigidity of the bracket 11a on the vehicle side, the locking capsule 47a and the energy absorbing member 53. Therefore, there is no unnecessary cost for materials, and design freedom for maintaining the original performance of these members is not impaired. Furthermore, by forming the locking hole 45 such that it is a closed hole with the front edge closed, it is possible to strengthen the construction for preventing the locking capsule 47a from dropping. The construction and function of other parts are the same as in the first example of the first embodiment, so drawings and explanations of identical parts are omitted.

First Example of Second Embodiment

Figure 12:
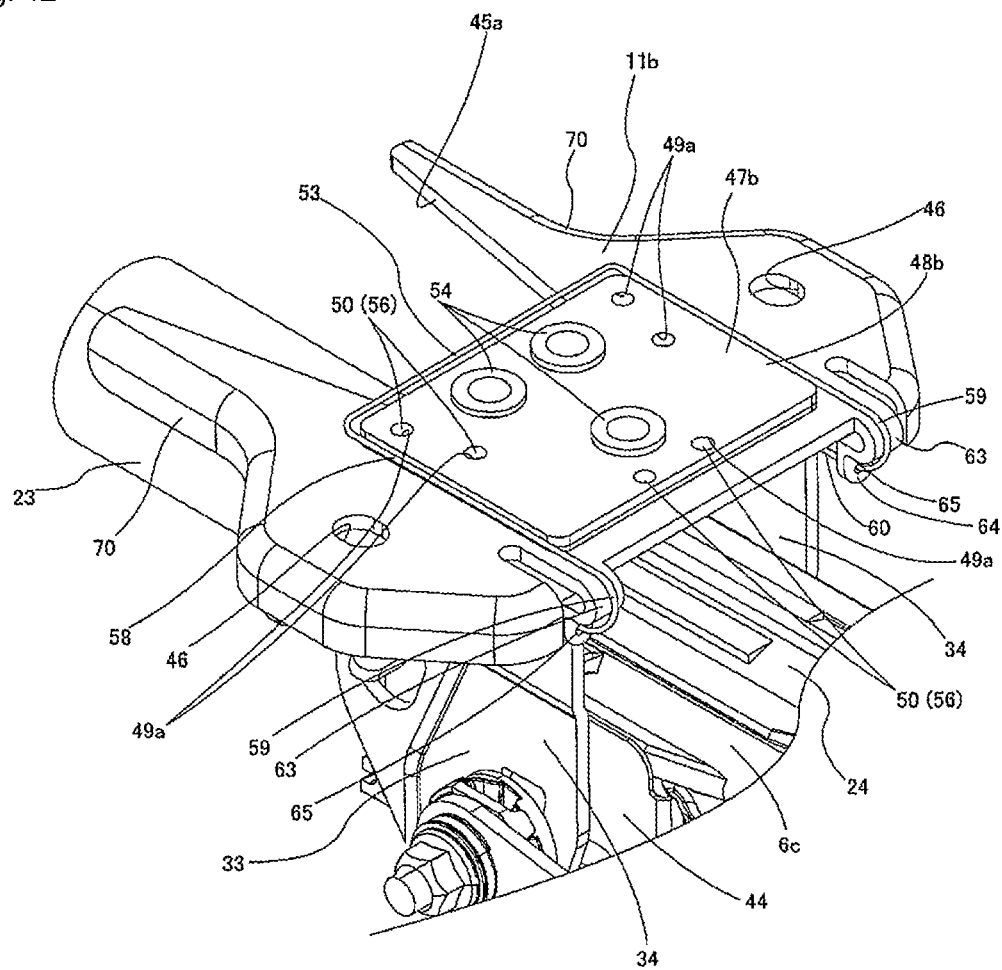
FIG. 12 is a perspective view illustrating a first example of a second embodiment of the present invention, and illustrates the state as seen from the upper rear.
Figure 13:
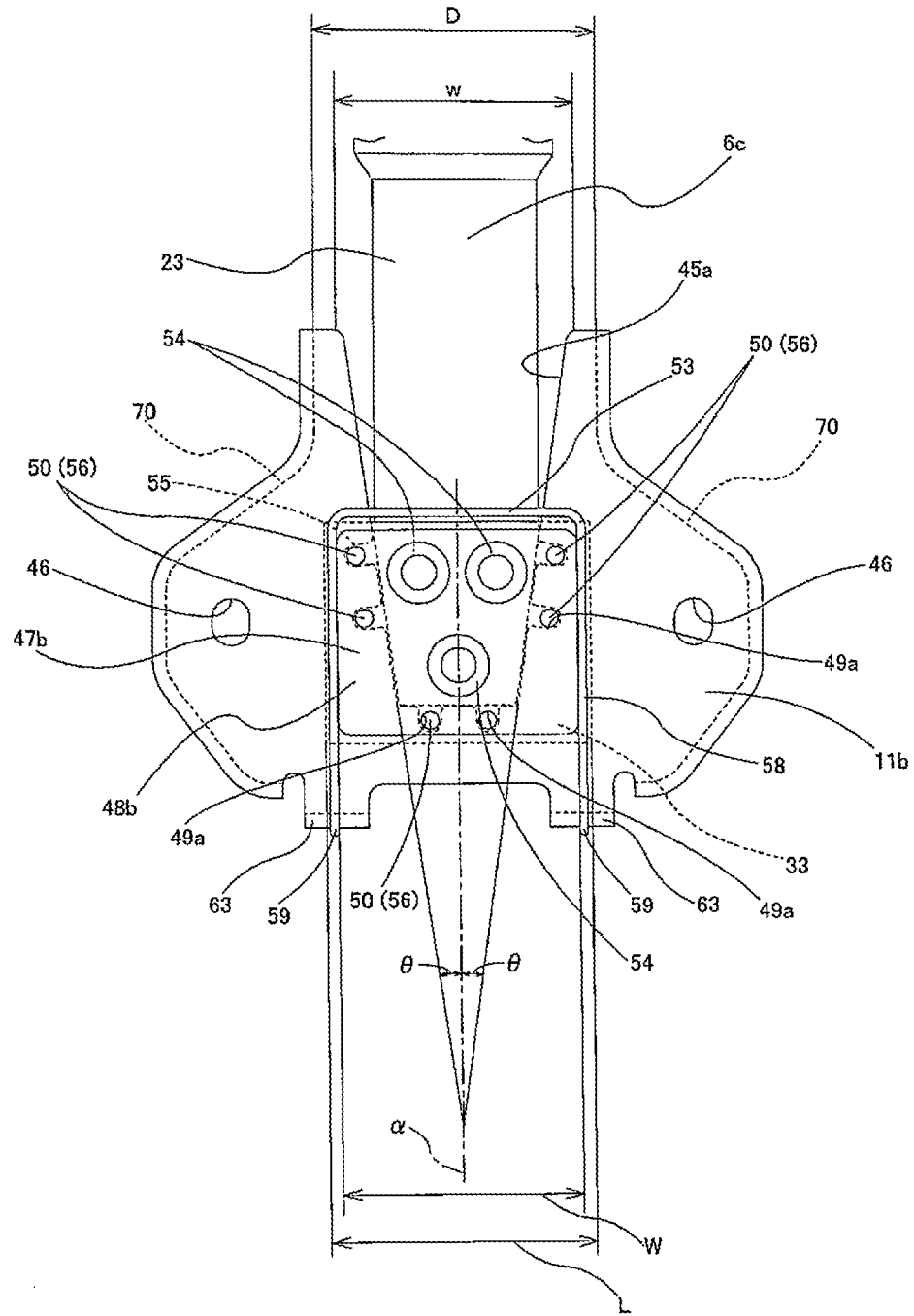
FIG. 13 is a top view illustrating the center section in FIG. 12 as seen from above.

FIGS. 12 and 13 illustrate a first example of a second embodiment of the present invention. The feature of this embodiment is that, regardless of the direction in which an impact load is applied to the steering column 6c when a secondary collision occurs acts, the shape of the locking hole (locking notch) 45a that is formed in the bracket 11b on the vehicle side is devised for keeping the load required to start forward displacement of the locking capsule 47b with respect to the bracket 11b on the vehicle side low. The construction and function of other parts is the same as in the first embodiment, so drawings and explanations of identical parts are omitted or simplified, such that the explanation below centers on the features of this example.

As in the first embodiment, the locking capsule 47b is connected to the top surface of the bracket 33 on the column side using a plurality of rivets (three in the example in the figures). The basic shape of this locking capsule is the same as that of the locking capsule 47a that is assembled in the construction of the first embodiment. In other words, the planar shape of the lower half section of the locking capsule 47b is trapezoidal with the left and right edges sloped in opposite directions from each other such that the width dimension of the lower half section becomes smaller going toward the rear. On the other hand, a flange section 48b that protrudes toward the rear and both sides is formed on the upper half section of the locking capsule 47b and hangs over the lower half section of the locking capsule 47b.

However, the edges on the left and right sides of the locking hole 45a that is formed in the bracket 11b on the vehicle side are sloped along their entire length in a direction toward the outside in the width direction of the bracket 11b on the vehicle side go toward the front. In other words, the edges on the left and right sides of the locking hole 45a are sloped in different direction at the same angle $\theta$ with respect to the center line $\alpha$ of the locking hole 45a that is parallel with the center line of the steering column 6c. The direction that the edges are sloped in is a direction such that the width in the left and right direction of the locking hole 45a gradually increases going toward the front. The angle of inclination $\theta$ of the edges on the left and right sides with respect to the center line a coincides with the angle of inclination of the surfaces on the left and right sides of the lower half section of the locking capsule 47b. However, the width dimension of the locking hole 45a is a little larger (for example 0.5 to 2 mm larger) than the width dimension of the coinciding portion in the forward/backward direction of the lower half section of the locking capsule 47b when in the combined state illustrated in FIG. 13. The width dimension W of the flange section 48b is sufficiently larger than the width dimension w of the opening section on the front end of the locking hole where the space between the left and right edges is a maximum (W>w).

By bending the metal plate of the bracket 11b on the vehicle side downward to form a pair of left and right bent sections on the edges on the left and right sides of the bracket 11b on the vehicle side, the bending rigidity of the bracket 11b on the vehicle side is improved. The portions on the front ends of these bent sections 70 are parallel with each other, and the space D between the inside surfaces of the portions on the front ends is a little larger than the width (length in the left and right direction) L of the top section of the bracket 33 on the column side (D>L). The edges on the bottom ends of the bent sections 70 are located a little further downward than the top end section of the bracket 33 on the column side. Furthermore, the continuous sections between the front end portion and the middle portion of the bent sections 70 are curved in a direction such that the space between the surfaces of the bent sections gradually increases. Therefore, the top end section of the bracket 33 on the column side enters between the front end sections of these bent sections 70 as a secondary collision advances, and moves forward being guided by the inside surfaces of these bent sections 70.

In this example, small notch sections 55 are formed at a plurality of locations (six location in the figure in the example) on the inside edge section of the locking hole 45a. These small notch sections 55 are each open toward the inside of the notch hole 45a. Furthermore, small through holes 49a are formed in the portions of the flange section 48a of the locking capsule 47b that are aligned with these small notch sections 55. In this example, through holes are not formed in portions separated from the small notch sections 55, however, as in the first embodiment, it is possible to form small through holes 49b and to form small through holes in the portions of the bracket 11b on the vehicle side that are aligned with these through holes.

As in the first embodiment, synthetic resin 56, which is a thermoplastic resin, is injected in the molten state by injection molding into the small notch sections 55 and the small through holes 49a that are formed in the locking capsule 47b, which is connected and the fastened to the bracket 33 on the column side by rivets, and the bracket 11b on the vehicle side so as to span between the bracket 11b on the vehicle side and the flange section 48b. Moreover, an energy absorbing member 53, similar to that assembled in the construction of the first embodiment, is provided between the locking capsule 47b and the bracket 11b on the vehicle side.

Particularly, in the construction of this example, the edges on the left and right sides of the locking hole 45a are sloped in opposite directions from each other such that the space between the edges expands going toward the front, so regardless of the direction in which the locking capsule is pushed during a secondary collision, it is possible to prevent the edges on the side of the locking capsule 47b from pressing strongly against the inside edges of the locking hole 45a in the bracket 11b on the vehicle side.

In other words, when a force is applied that pushes the locking capsule 47a straight ahead in the forward direction, or when a force is applied diagonally in the forward direction, in either case, when the angle of inclination of the direction in which the force applied to the locking capsule 47a acts with respect to the center line $\alpha$ of the locking hole 45a is less then the angle of inclination $\theta$ of the inside edges of the locking hole 45a, the left and right inside edges of the locking hole 45a, and the surfaces on the left and right sides of the locking capsule 47b that face these inside edges separate immediately. Therefore, it is possible to prevent large friction forces from acting between these inside edges and the opposing surfaces.

On the other hand, when the direction in which the force applied to the locking capsule 47b acts during a secondary collision is greater than the angle of inclination $\theta$ of the inside edges of the locking hole 45a, one of the side surfaces of the surfaces on the left and right sides of the locking capsule 47b will be pressed against one of the edges of the left and right inside edges of the locking hole 45a. In this case as well, the size of the portion of the force that acts in a direction that presses one of the side surfaces of the locking capsule 47b against one of the inside edges of the locking hole 45a can be kept smaller than the portion corresponding to the angle of inclination θ of the edge, or in other words, is kept to a size that corresponds to the angle of inclination of the direction in which the force acts minus the angle θ. Moreover, in the case of this example, synthetic resin 56 is located between the inside edges of the locking hole 45a and the surfaces on the left and right sides of the locking capsule 47b. Therefore, when both the locking capsule 47b and the bracket 11b on the vehicle side are made of metal such as carbon steel, there is no strong rubbing between the metal surfaces on the sides of the locking capsule 47b and the inside edges of the locking hole 45a even when a diagonal force in the forward direction is applied to the locking capsule 47b during a secondary collision. As a result, it is possible to keep the force required for the locking capsule 47b to start displacing in the forward direction at the instant that a secondary collision occurs low, and lessen the impact that is applied to the body of the driver at the instant that this secondary collision occurs, and thus it is possible to more completely protect the driver.

In the case of the construction of this example, the width dimension of the locking hole 45a gradually increases going toward the opening on the front end of the locking hole 45a, however, in the state after the secondary collision has advanced to a certain extent, the displacement in the width direction of the locking capsule 47b is restricted by the engagement between the top end section of the bracket 33 on the column side and the front end sections of the bent sections 70. Therefore, even though the width dimension of the flange section 48b formed on the upper half section of the locking capsule 47b is not made particularly large, the bottom surface of both end sections of the flange section 48b is kept engaged with the top surface of the front end section of the bracket 11b on the vehicle side, so it is possible to prevent the steering wheel 1 from dropping excessively. The construction and functions of other parts are the same as in the first example of the first embodiment, so drawings and explanations of identical parts are omitted.

Second Example of Second Embodiment

Figure 14:
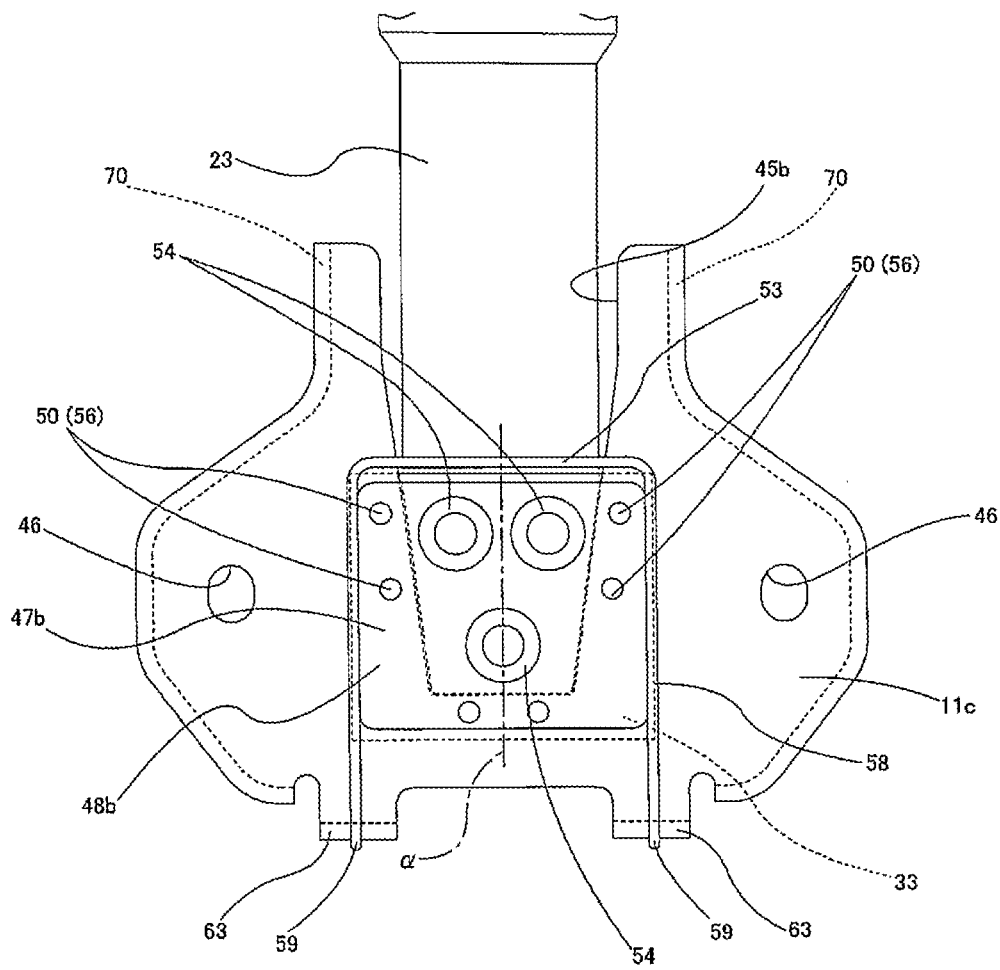
FIG. 14 is a drawing illustrating a second example of the second embodiment of the present invention, and is similar to FIG. 13.

FIG. 14 illustrates a second example of the second embodiment of the present invention. In this example, the front half section of the portion of the locking hole 45b, which is formed in the center section in the width direction of the bracket 11c on the vehicle side, that is exposed and is further toward the front than the locking capsule 47b before a secondary collision occurs is parallel with respect to the center line α of the locking hole 45b. That is, only the portions of the edges on the left and right sides of the locking hole 45b that are engaged with the side surfaces of the locking capsule 47b at the instant a secondary collision occurs and immediately afterwards are inclined in a direction such that the space between the edges increases going toward the front. After the locking capsule 47b begins to displace in the forward direction due to a secondary collision, the locking hole 45a guides the locking capsule 47b in the direction of the center line α.

With the construction of this example, constructed as described above, as the secondary collision advances, the top end section of the bracket 33 on the column side can smoothly enter in between inside surfaces on the front end sections of the pair of bent sections 70 that are formed on the edges on the left and right sides of the bracket 11c on the vehicle side. In other words, it is possible to keep any shifting between the left and right outside surfaces of the top section of the bracket 33 on the column side and the inside surfaces of the bent sections 70 that occurs as the secondary collision advances to a minimum. It is also possible for the top end section of the bracket 33 on the column side to smoothly enter between the inside surfaces of the bent sections 70. Furthermore, by guiding the top end section of the bracket 33 on the column side between the inside surfaces of the bent sections 70 during the final stages of a secondary collision, it is possible to cause forward displacement of the steering wheel 1 while suppressing shifting movement in the left and right direction of the steering wheel 1. The construction and function of other parts are the same as in the first example of the first embodiment and the first example of the second embodiment, so drawings and explanations of identical parts are omitted.

Third Example of Second Embodiment

Figure 15:
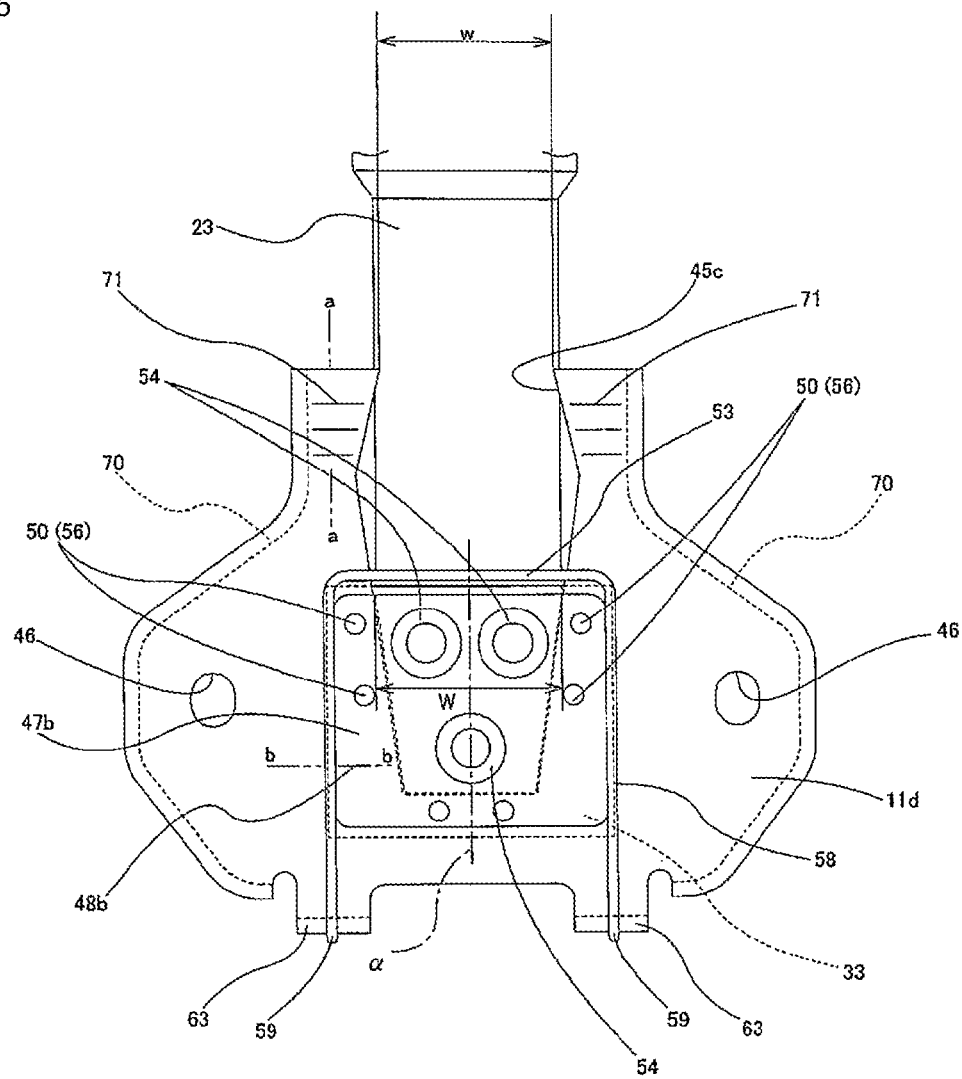
FIG. 15 is a drawing illustrating a third example of the second embodiment of the present invention, and is the similar to FIG. 13.
Figure 16:
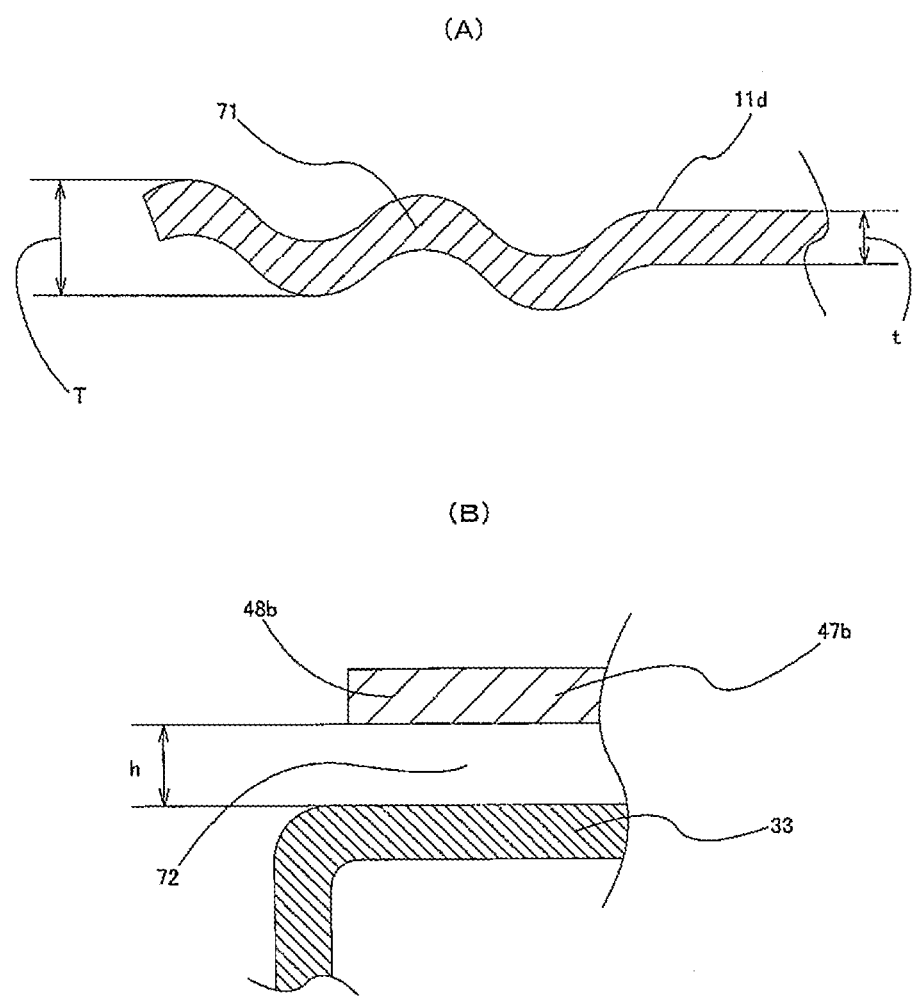
FIG. 16A is a cross-sectional view of section a-a in FIG. 15.
FIG. 16B is a cross-sectional view of section b-b.
Figure 18:
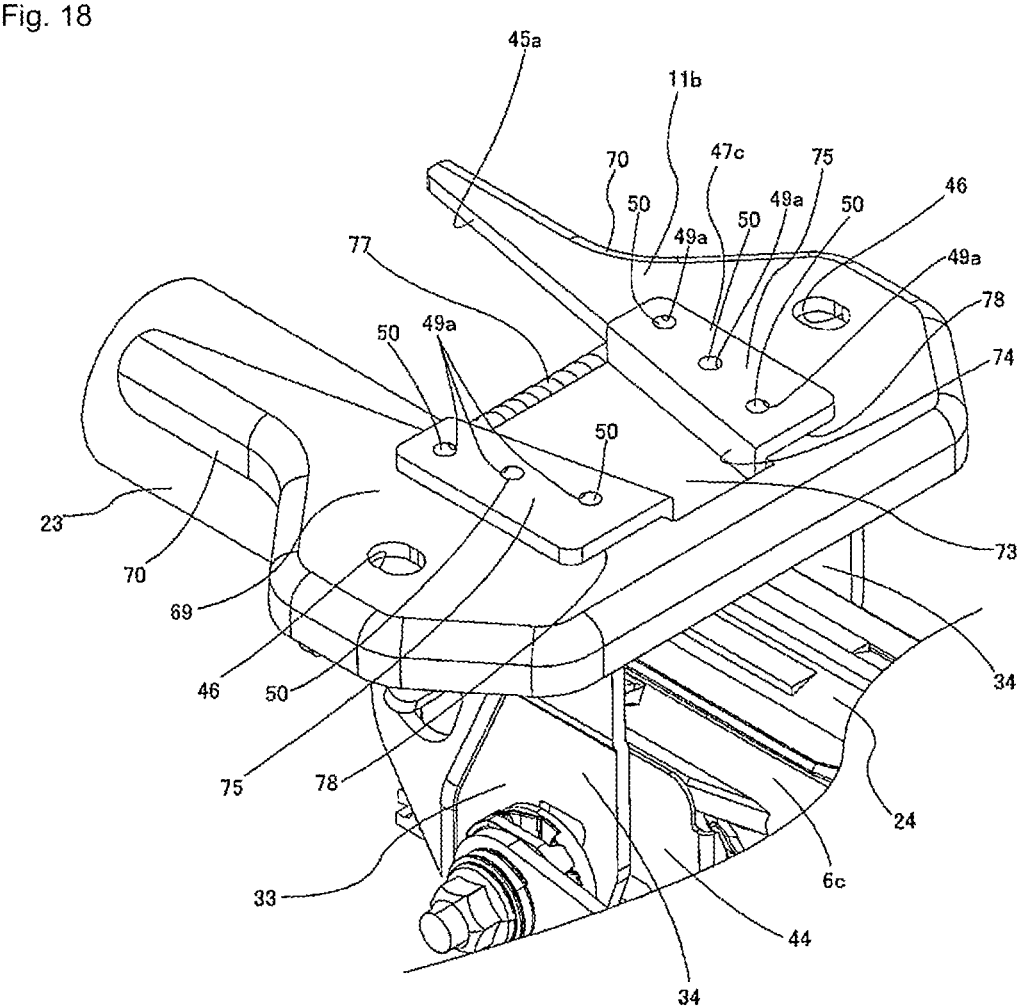
FIG. 18 is a drawing illustrating a seventh example of the second embodiment of the present invention, and is similar to FIG. 12.
Figure 19:
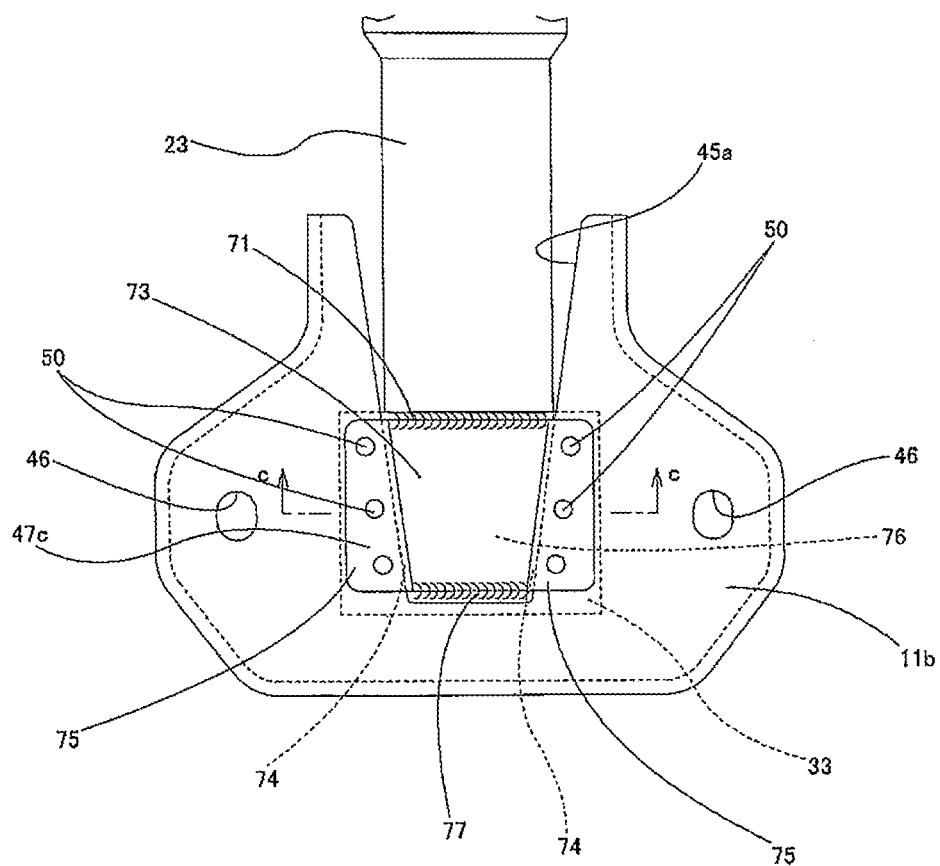
FIG. 19 is a top view illustrating the center section in FIG. 19 as seen from above.
Figure 20:
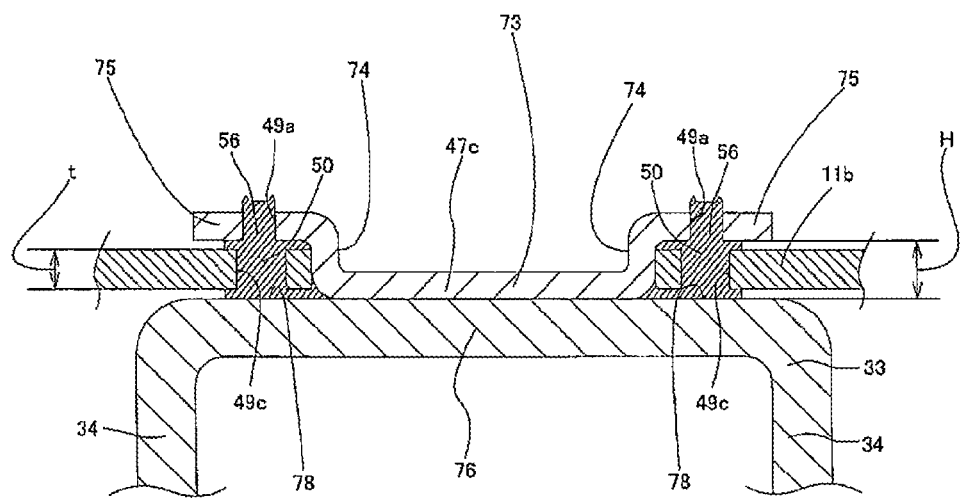
FIG. 20 is a cross-sectional view of section c-c in FIG. 19.

FIG. 15 and FIG. 16 illustrate a third example of the second embodiment of the present invention. In this example, of the exposed portions of the locking hole 45c, which is formed in the center section in the width direction of the bracket 11d on the vehicle side, that are in front of the locking capsule before a secondary collision occurs, the middle section and the front end section are inclined inversely with the portion of the edges on the left and right sides of the rear half portions that are engaged with the locking capsule 47b before a secondary collision and in opposite directions from each other with respect to the center line α. The width dimension from the middle section to the front end section gradually becomes smaller going toward the front. The width w of the opening section of the locking hole 45c is less then the maximum width of the portion where the lower half section of the locking capsule 47b engages with the locking hole 45c (w<W).

In the case of this example, in the normal state before a secondary collision occurs, the exposed portions on both sides of the locking hole 45c of on the front section of the bracket 11d on the vehicle side that are in front of the locking capsule 47b are wave shaped in the forward/backward direction as illustrated in FIG. 16A. That is, both sides of the front section of the locking hole 45c of the bracket 11d on the vehicle side that protrude further toward the front than the front surface of the locking capsule 47b in the normal state are a wave-shaped portion 71 that is curved in alternating opposite direction along the forward/backward direction, where the apparent thickness dimension T of this wave-shaped portion 71 is greater than the thickness dimension t of the metal plate of the bracket 11d on the vehicle side (T>t). As illustrated in FIG. 16B, the thickness dimension t of this metal plate is the same or a little less than the height dimension h of the space 72 between the bottom surface of the flange section 48b that is formed on the left and right side surface of the top section of the locking capsule 47b and the top surface of the bracket 33 on the column side, or in other words the height of the portion where the bracket 11d on the vehicle side is held in the normal state from the top and bottom (t≦h). Therefore, the apparent thickness dimension T of the wave-shaped portion is greater than the height h of the space 72 (T>h).

In the case of the construction of this example having the construction described above, during a secondary collision, the locking capsule 47b displaces in the forward direction while the bracket 11d on the vehicle side plastically deforms. First, the lower half section of the locking capsule 47b displaces in the forward direction while pressing open the front half section of the locking hole 45c. As a result, impact energy that is applied to the locking capsule 47b during the secondary collision is absorbed equal to the amount that causes the front section of the bracket 11d on the vehicle side to plastically deform. Second, as the wave-shaped portion 71 passes the portion of the space 72, the locking capsule 47b displaces in the forward direction while this wave-shaped portion 71 is plastically deformed in the pressed direction. When this happens, impact energy is also absorbed by the plastic deformation of the wave-shaped portion 71. The amount that is absorbed can be arbitrarily adjusted by changing the height of the wave shape of this wave-shaped portion 71. Therefore, when a plurality of wave shapes are formed in the forward/backward direction, by making the height of each wave shape lower on the rear side and increasing the height in the direction toward the front side, it is possible to gradually increase the amount of impact energy that is absorbed as the secondary collision advances, and thus it is possible to obtain favorable characteristics from the aspect of protecting the driver.

The construction and function of the other parts are the same as in the first example of the first embodiment and the first and the second example of the second embodiment, so drawings and explanations of identical parts are omitted. The construction if this example of forming a wave shape in the portions of the front section of the bracket on the vehicle side on both sides of the locking hole can also be used in combination with the construction of the other examples above.

Fourth to Sixth Examples of Second Embodiment

FIGS. 17A to 17C illustrate fourth through sixth examples of the second embodiment of the present invention. In the first through third examples of the second embodiment, the front section of the bracket on the vehicle side is located on the same plane as the rear section, however, in the case of the construction of the fourth example illustrated in FIG. 17A, the front section is bent upward with respect to the rear section. Moreover, in the case of the fifth example illustrated in FIG. 17B, the front section is bent downward with respect to the rear section. Furthermore, in the case of the construction of the sixth example illustrated in FIG. 17C, the front section is bent downward with respect to the rear section, and the front section is wave shaped. With the construction of the fourth through sixth examples, it is possible to restrict the up/down position of the steering wheel 1 after a secondary collision occurs.

Seventh Example of Second Embodiment

FIG. 18 to FIG. 22 illustrate a seventh example of the second embodiment of the present invention. In this example, in order to simplify the construction of the connecting section between the locking capsule 47c and the bracket 33 on the column side, the locking capsule 47c and the bracket 33 on the column side are made of the same kind of metal plate such as carbon steel and welded together to maintain strength and rigidity, and the shape of the locking capsule 47c is devised. In other words, the locking capsule 47c comprises a base section 73, a pair of left and right raised sections 74, and a pair of left and right flange sections 75. Of these, the base section 73 is a flat plate. The raised sections 74 are formed by bending both end sections in the width direct of the base plate section 73 upward at right angles. These raised sections 74 are inclined in the same direction and at the same angle as the edges on the left and right sides of the locking hole 45a that is formed in the bracket 11b on the vehicle side, with the space between these raised sections 74 becoming more narrow going toward the rear. Furthermore, the flange sections 75 are formed by bending the top ends of the raised sections 74 in opposite directions from each other. The height H of the stepped section formed with the bottom surface of the flange sections 75 and the bottom surface of the base plate section 73 is a little greater than the thickness t of the metal plate of the bracket 11b on the vehicle side (H>t).

The locking capsule 47c, having this kind of construction, is connected to the top plate section 76 that is formed on the top end section of the bracket 33 on the column side by welds 77 with the base plate 73 overlapping the top plate section 76. The top plate section 76 is formed such that it connects the edges on the top ends of the pair of left and right support plate sections 34 of the bracket 33 on the column side. In this example, the dimension in the forward/backward direction of the base plate section 73 is less than the dimension in the same direction of the portion of the top plate section 76 that is overlapped by this base plate section 73. With the base plate section 73 overlapping the top plate section 76, the end sections on both the front and rear of the top plate section 76 protrude in the forward/backward direction from the edges of both ends in the forward/backward direction of the base plate section 73. Welding 77 is performed between the edges on both the front and rear ends of the base plate section 73 and the top surface of the end sections on both the front and rear of the top plate section 76. In this example, the welds 77 are fillet welds.

With the locking capsule 47c welded and fastened to the center section of the top surface of the top plate section 76 of the bracket 33 on the column side, locking grooves 78 are formed in the space between the portion near both ends of the top surface of the top plate 76 and the bottom surface of the flange sections 75, in which the portions on both sides of the locking hole 45a in the part of the metal plate of the installation plate sections 69 of the bracket 11b on the vehicle side can be inserted. The locking capsule 47c is attached to the inside back end section of the locking hole 45a by inserting the portions of the installation plate section 69 on both sides of the locking hole 45a into these locking grooves 78. In this state, the flange section 75 overlaps the portions of the installation plate section 69 on both sides of the locking hole 45a. Next, connecting pins 50 are formed by performing injection molding of injecting of synthetic resin 56 into the small through holes 49a on the locking capsule 47c side and the small through holes 49c or small notch sections 55 on the bracket 11b side that are formed such that they are aligned with each other in this overlapping state. In this state, the locking capsule 47c and the bracket 33 on the column side are connected to the bracket 11b on the vehicle side such that they can break away in the forward direction due to an impact load during a secondary collision.

With the construction of this example constructed as described above, it is possible to simplify tuning for stabilizing forward displacement of the steering wheel 1 during a secondary collision, lessen the impact applied to the body of the driver at the instant that a secondary collision occurs, and completely protect the driver, as well as, make the apparatus more compact and lightweight, lower the cost and maintain design freedom. In other words, the locking capsule 47c and bracket 33 on the column side, which are both made of metal plate, are connected and fastened together by welding, so there is no need for bolts, whose tip end sections protrude from the top side of the locking capsule, or nuts that screw onto those tip end sections. That is, only the pair of left and right flange sections 75 of the locking capsule 47 protrude from the top surface of the bracket 11b on the vehicle side. The thickness of the metal plate of the flange sections 75 is only about 2 to 4 mm in the case of a steering column support apparatus that is installed in a typical automobile. Moreover, there are also no protruding sections (for example the head sections of bolts) on the bottom surface side of the top plate section 76. Therefore, it is possible to suppress an increase in assembly dimensions caused by the existence of nuts and bolts, and thus it is possible to make the apparatus more compact and lightweight. Furthermore, because there is no need for nuts and bolts, it is possible to lower costs and make the apparatus more compact, so design freedom of the steering apparatus installation portion can be maintained.

In construction that uses a locking capsule made of metal plate, there is a possibility that when the locking capsule and the bracket on the column side and the space between these members and the bracket on the vehicle side are covered with synthetic resin the following problems may arise. For example, when the edges on the left and right sides of the locking hole are parallel with each other, there is a possibility that the synthetic resin that is filled in these spaces may become a resistance against the displacement in the forward direction of the locking capsule and bracket on the column side with respect to the bracket on the vehicle side.

On the other hand, in this example, the left and right inside edges of the locking hole 45a are inclined in a direction such that the width dimension of the locking hole 45a gradually becomes wider going toward the front, so immediately after a secondary collision occurs, the synthetic resin 56 and the edges on the left and right sides of the locking hole 45a separate, or even when there is rubbing, the contact pressure at the area of rubbing is kept low. Therefore, occurrence of the problem described above of strong friction occurring between the synthetic resin 56 and the left and right inside edges of the locking hole 45a is prevented, and it is possible for the steering wheel 1 to displace smoothly in the forward direction together with the locking capsule 47c and the bracket 33 on the column side.

This will be explained in reference to FIG. 21 and FIGS. 22A to 22C. When the locking capsule 47c is made of metal plate, the bending processes illustrated in order in FIGS. 22A→22B→22C are performed on the metal raw plate illustrated in FIG. 22A to obtain the locking capsule 47c illustrated in FIG. 22C. After the locking capsule 47c is obtained in this way, a convex curved surface 80, having a quarter circle arc shaped cross section, is formed in the continuous section between the bottom surface of the base plate section 73 and the outside surfaces of the pair of left and right raised sections 74. With the base plate section 73 of this kind of locking capsule 47c welded and fastened to the top plate section 76 of the bracket 33 on the column side, a wedge shaped space is formed in between the top surface of the top plate section 76 and the convex curved surface 80. When connecting pins 50 for connecting the locking capsule 47c and bracket 33 on the column side with the bracket 11b on the vehicle side by performing injection molding using synthetic resin 56, part of the synthetic resin 56 enters into this wedge shaped space and solidifies inside this space. Particularly, when the receiving sections that are formed in the bracket 11b on the vehicle side are small notch sections 55, the synthetic resin 56 enters completely into this space along the entire length.

Figure 21:
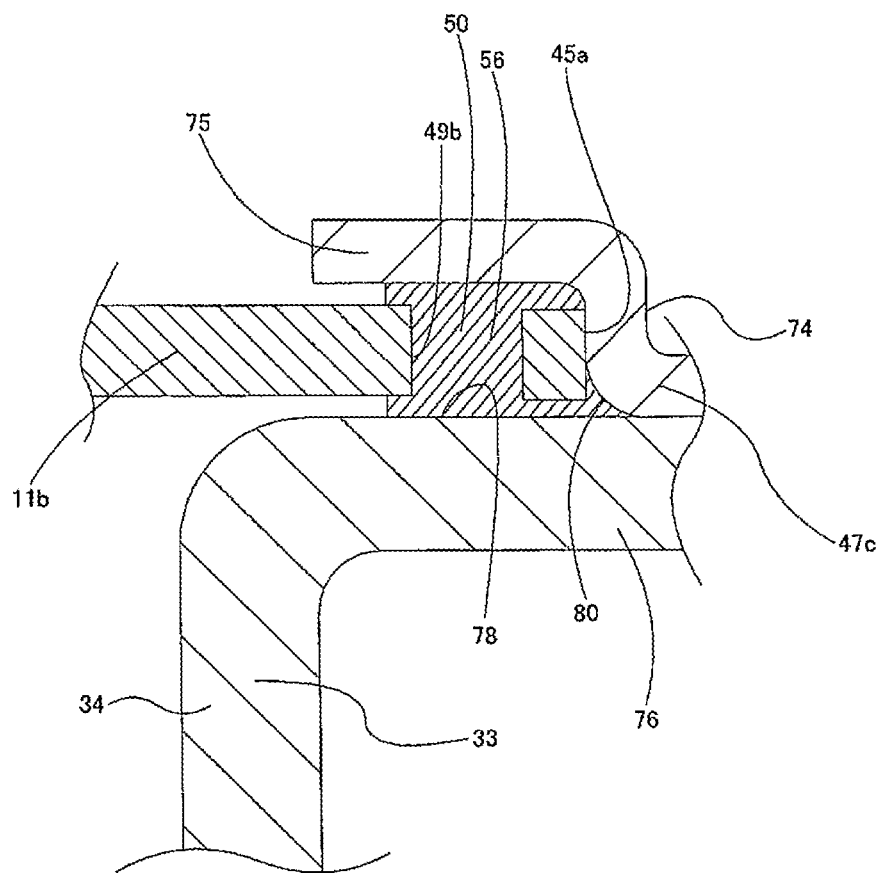
FIG. 21 is a drawing illustrating the state after a secondary collision, and corresponds to the left section in FIG. 20.

From the aspect of preventing vibration in the connecting section between the locking capsule 47c, the bracket 33 on the column side and the bracket 11b on the vehicle side, having part of the synthetic resin solidify inside this wedge shaped space is preferable. However, the inner surfaces of this wedge shaped space and the synthetic resin 56 that is solidified inside the space come in contact over a large surface area. The coefficient of friction in the area of rubbing between this synthetic resin 56 and the locking capsule 47c and bracket 33 on the column side, which are made of metal, is small, however, the surface area of the area of rubbing is large, so is not preferable from the aspect of trying to lower as much as possible the load required for causing the locking capsule 47c and the bracket 33 on the column side to displace in the forward direction during a secondary collision. In other words, the synthetic resin 56 that is solidified in this space has a pointed tip end, and as illustrated in FIG. 21, during a secondary collision, the synthetic resin 56 remains in position attached to the sides of the bracket 11b on the vehicle side, however, the locking capsule 47c and the bracket 33 on the column side displace in the forward direction. When the locking capsule 47c and the bracket 33 on the column side displace in the forward direction with the synthetic resin 56 having a pointed tip end remaining as is inside the wedge shaped space, the friction in the area of rubbing becomes large. Therefore, there is a possibility that this will be disadvantageous from the aspect of stabilizing the load required for causing the steering wheel 1 to displace in the forward direction and protecting the driver.

However, in the construction of this example, the edges on the left and right sides of the locking hole 45a are inclined in a direction such that the width dimension of the locking hole 45a gradually becomes wider going toward the front, so during a secondary collision, there is a tendency for the synthetic resin 56 to separate from the surfaces of the opposing surfaces, which are the surfaces of the locking capsule 47c and the bracket 33 on the column side. In other words, it becomes easy for the synthetic resin 56 with a pointed tip to immediately come out from the wedge shaped space. Therefore, strong friction between this synthetic resin 56 and the surfaces of the locking capsule 47c and the bracket 33 on the column side is prevented, and smooth displacement in the forward direction of the steering wheel 1, together with the locking capsule 47c and the bracket 33 on the column side, is not impaired. The construction and function of the other parts are the same as in the case of the first example of the first embodiment and the first example of the second embodiment, so any redundant explanation is omitted.

Eighth Example of Second Embodiment

Figure 23:
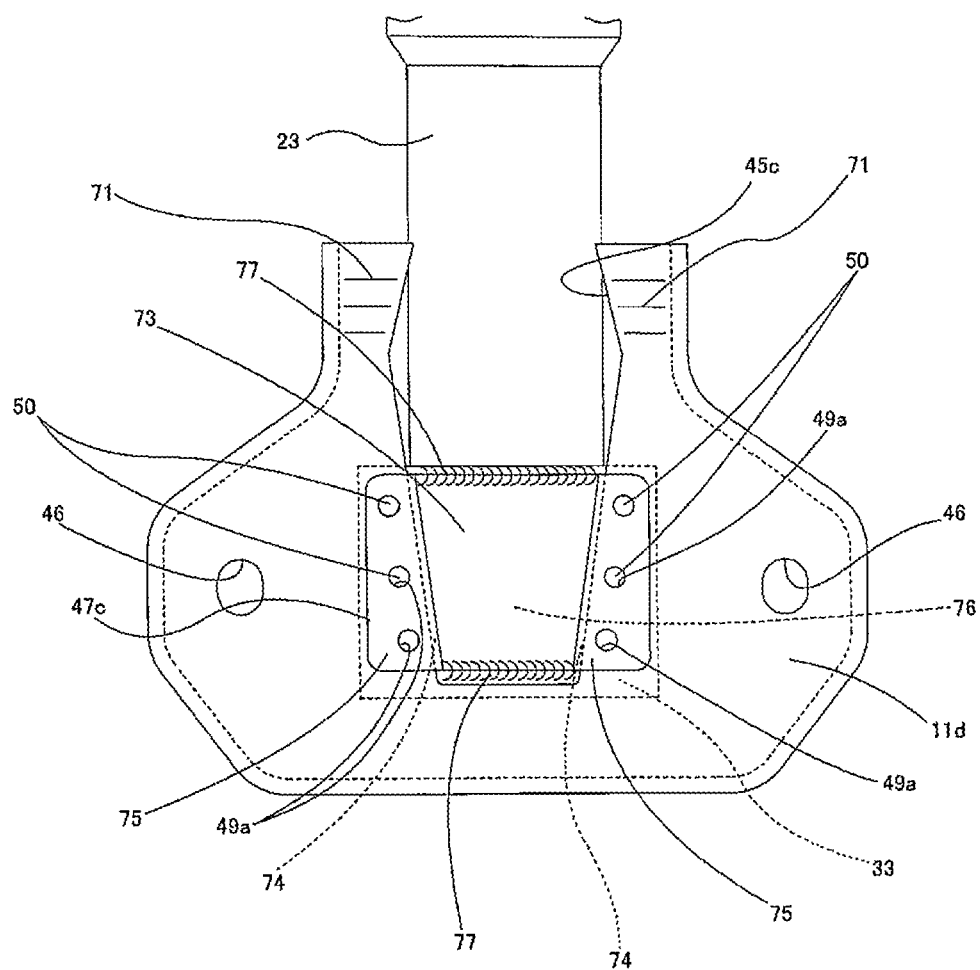
FIG. 23 is a drawing illustrating an eighth example of the second embodiment of the present invention

FIG. 23 illustrates an eighth example of the second embodiment of the present invention. The construction of this example is a combination of the bracket 11d on the vehicle side that is assembled in the third example of the second embodiment, and the locking capsule 47c made of metal plate that was assembled in the seventh example of the second embodiment. With the construction of this example, the function and effects that were obtained in the third example and seventh example are obtained. The construction and function of other parts are the same as in the first example of the first embodiment and the first example of the second embodiment, so any redundant explanation is omitted.

Third Embodiment

Figure 24:
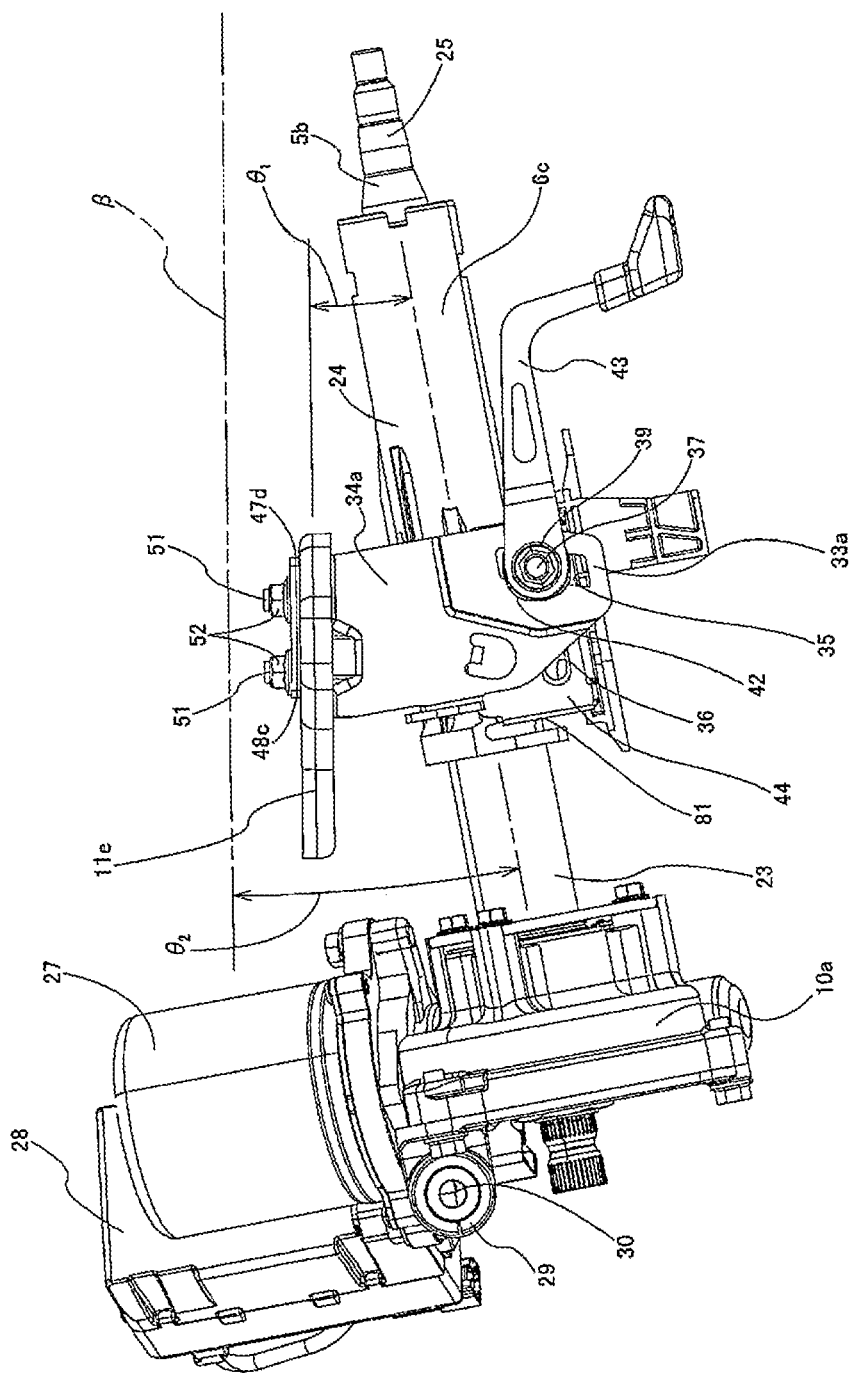
FIG. 24 is a side view illustrating an example of a third embodiment of the present invention, and is similar to FIG. 13.
Figure 25:
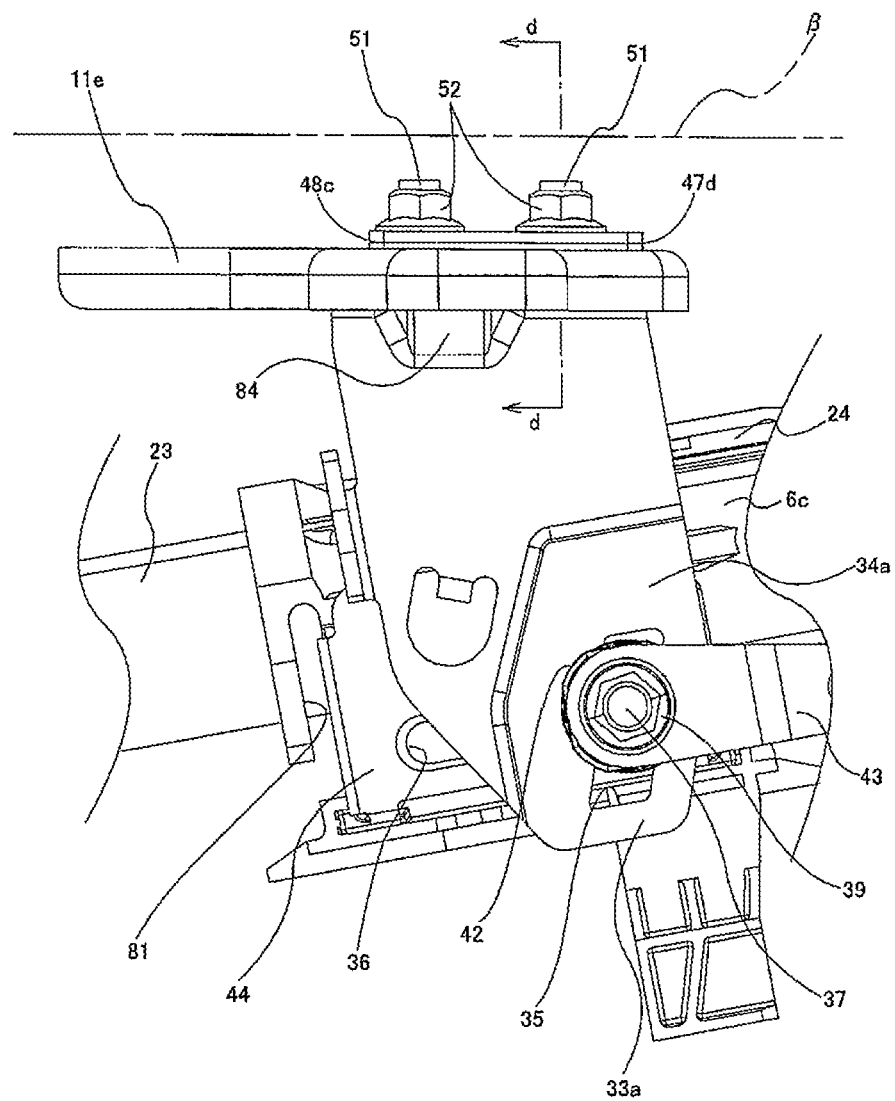
FIG. 25 is an enlarged view of the center section in FIG. 1.
Figure 26:
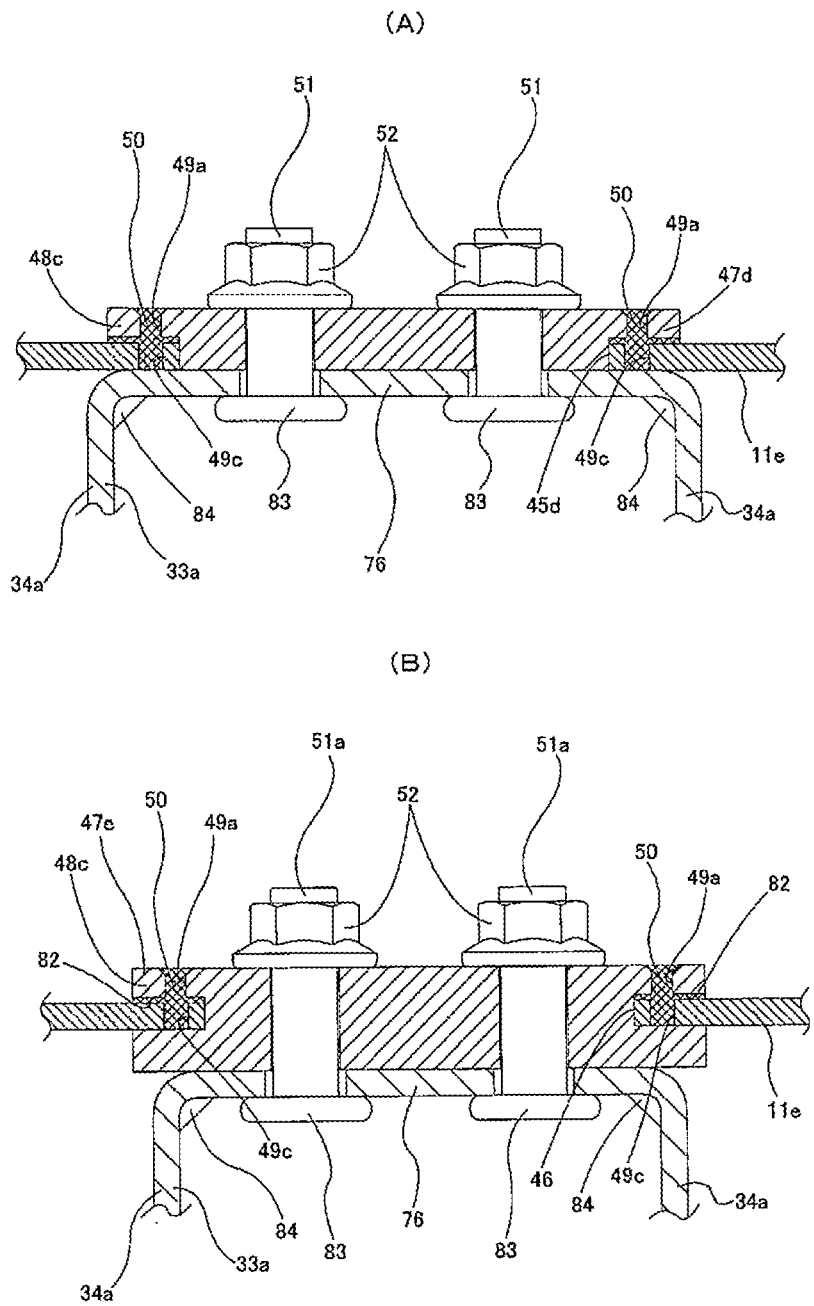
FIGS. 26A and 26B are drawings illustrating two examples of the construction of a connecting section between the bracket on the vehicle side and the locking capsule, and are cross-sectional views of section d-d in FIG. 25.
Figure 27:
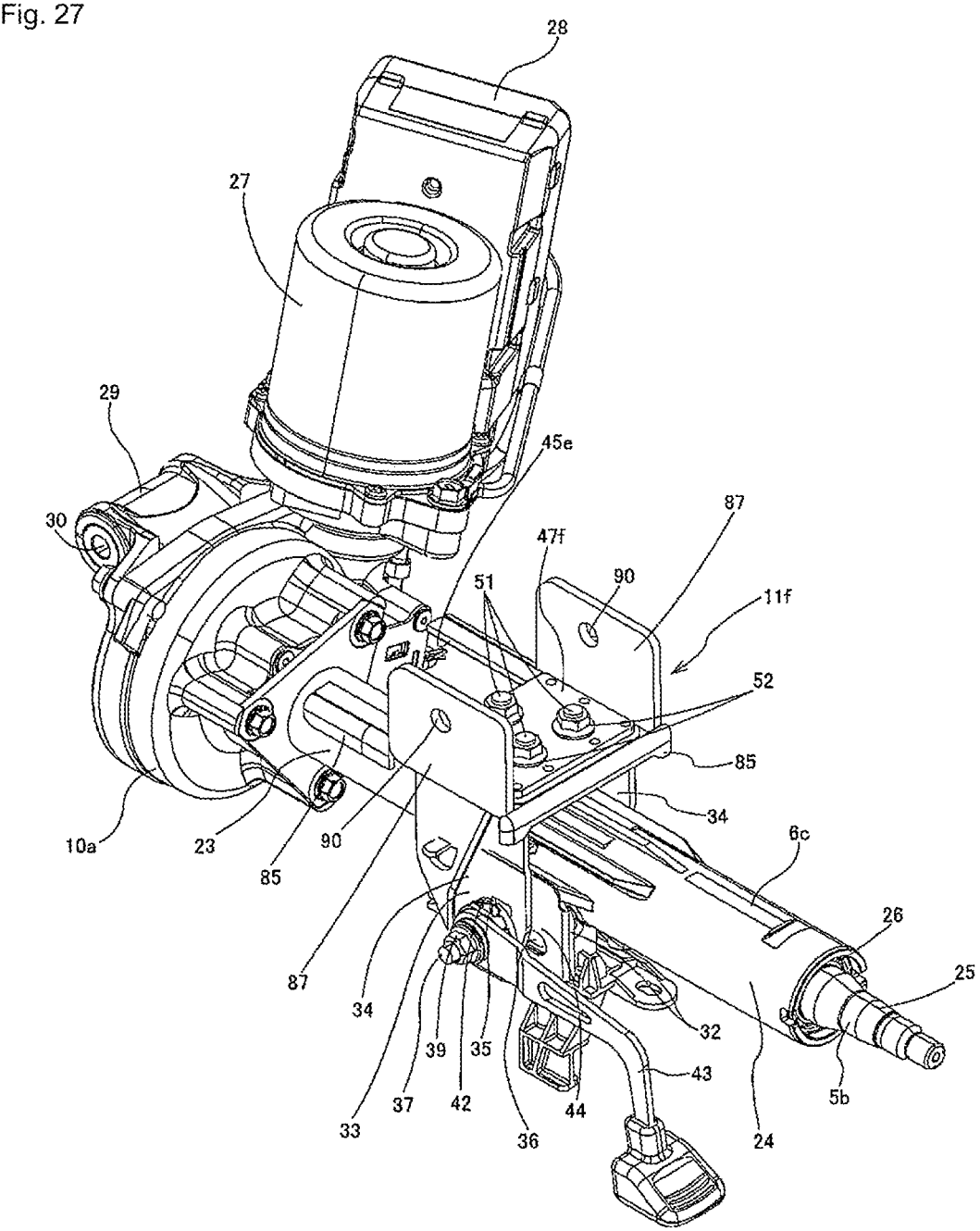
FIG. 27 is a perspective view of a first example of a fourth embodiment of the present invention, and illustrates the state as seen from the upper rear.
Figure 28:
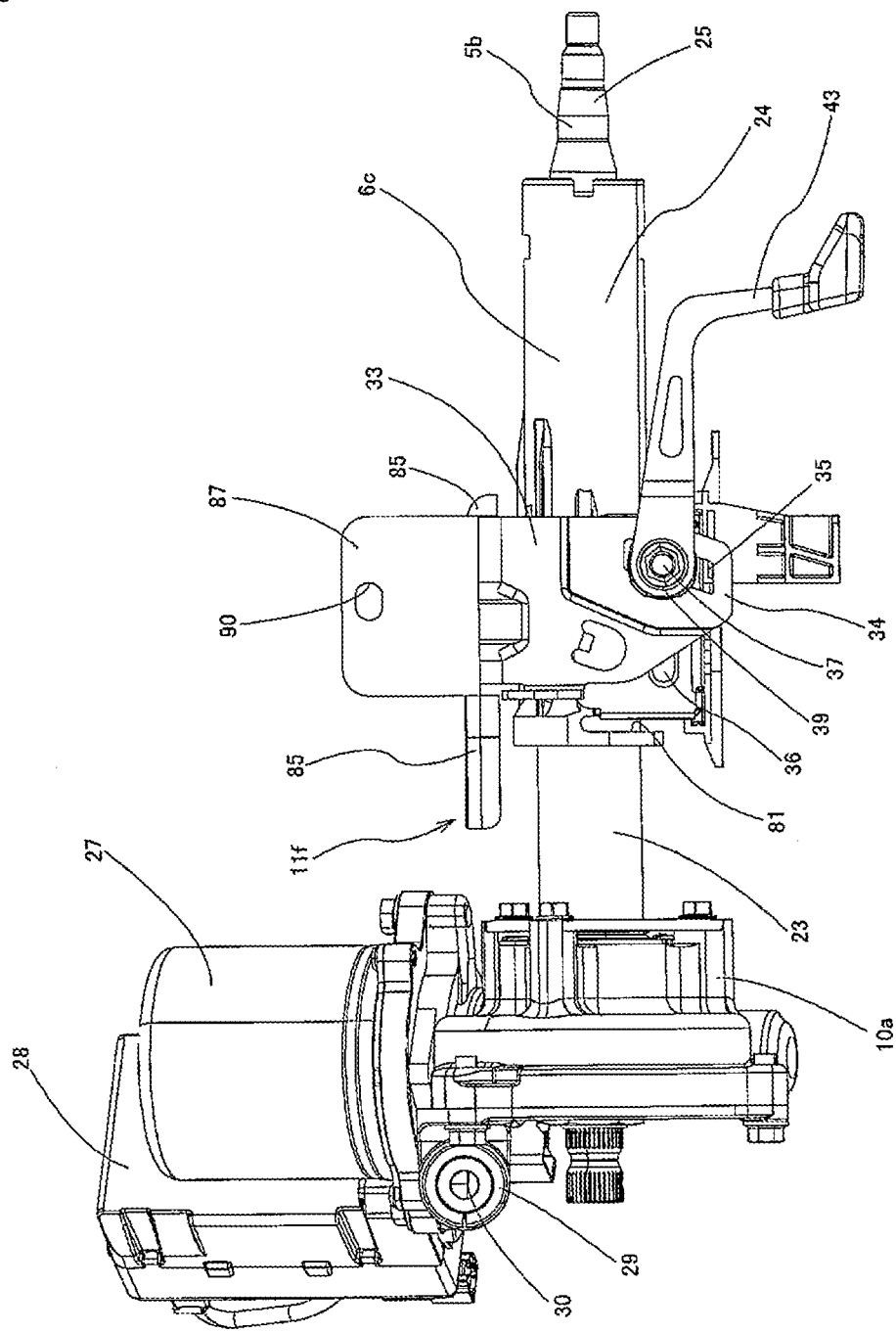
FIG. 28 is a side view as seen from the left in FIG. 27.
Figure 29:
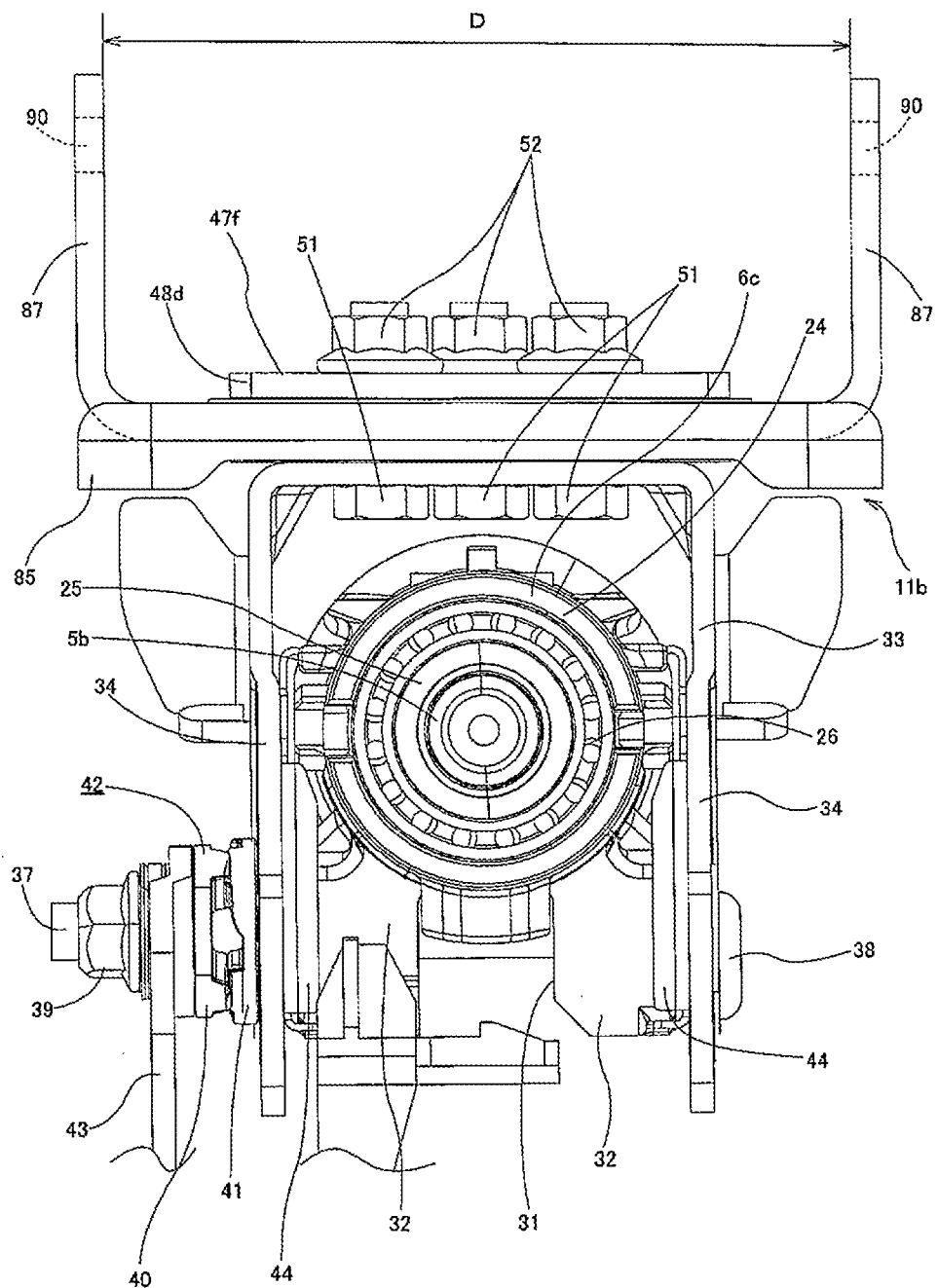
FIG. 29 is an end view as seen from the right in FIG. 28.
Figure 30:
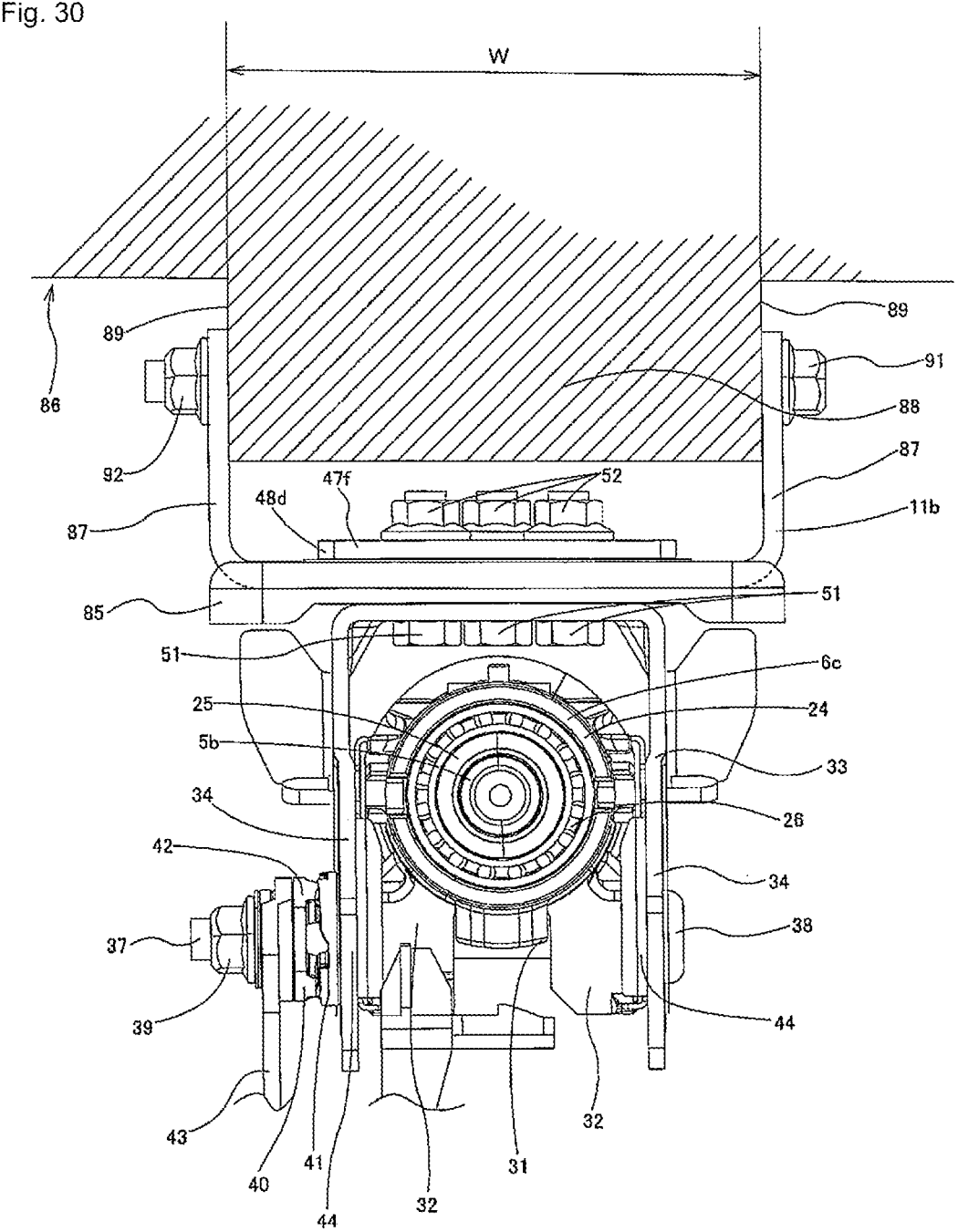
FIG. 30 is a drawing illustrating attachment to the vehicle body, and is similar to FIG. 29.

FIG. 24 to FIG. 26 illustrate an example of a third embodiment of the present invention. The feature of this example is that the installation direction (installation orientation) of the bracket 11e on the vehicle side with respect to the bracket 33a on the column side has been devised in order to keep the load required for starting forward displacement of the locking capsule 47d (47e) with respect to the bracket 11e on the vehicle side when a secondary collision occurs low. The construction and function of the other parts are the same as in the first embodiment and second embodiment, so drawings and explanations of identical parts are omitted or simplified, such that the explanation below centers on the feature of this example.

In this example, the locking capsule 47d is connected and fastened to the top surface of the bracket 33a on the column side by a plurality of bolts and nuts 52 (three bolts and nuts in the example in the figure). In the example in the figures, bolts having a flat disk shaped head section 83 are used as the bolts 51 in order to keep the assembly height of the connecting section between the bracket 33*a* on the column side and the locking capsule 47*d* low. The construction of the locking capsule is the same as in the first and second embodiments, and either the locking capsule 47*d* illustrated in FIG. 26A or the locking capsule 47*e* illustrated in FIG. 26B can be used. The locking capsule 47*e* is such that locking grooves 82 are formed in the surfaces of both the left and right sides, and the edge sections on both sides of the locking hole 45*d* of the bracket 11*e* on the vehicle side engage in these locking grooves 82. The top side of the locking capsule 47*e* similarly comprises flange section 48*c*, and the middle sections in the up/down direction of both sides where the locking grooves 82 are formed correspond to the locked sections of the present invention. In the case of the construction of this example, the assembly height is disadvantageous, however, only the bracket 11*e* on the vehicle side 11*e* and the locking capsule 47*e* need to be set in the die for performing injection molding of the connecting pins 50, so making the die more compact and simplifying the injection molding process is advantageous. For simplification of the explanation below, it will be presumed that in the case of using the locking capsule 47*d* illustrated in FIG. 26A and the vehicle is on a horizontal surface. Furthermore, orientation of the steering column 6*c* will be presumed to be in the center position in the tilt direction.

In the case of this example, construction of the bracket 33*a* on the column side is devised. The bracket 33*a* on the column side is formed by connecting the edges on the top ends of a pair of left and right support plate sections 34*a* with a top plate section 76. Reinforcement rib sections 84 are formed in the connecting sections between the edges on the top ends of the support plate sections 34*a* and the edges on the left and right ends of the top plate section 76 to improve the bending rigidity of these connecting sections. The basic construction of this kind of bracket 34*a* on the column side is the same as the construction of the first example of the first embodiment, however, the direction of placing the top plate section 76 with respect to the support plate sections 34*a* of the bracket 33*a* on the column side that is assembled in the construction of this example is devised. More specifically, the angle between the edges on the front ends of the support plate sections 34*a* and the top plate section 76 is a sharp angle and the edges on the rear end of the support plate sections 34*a* and the top plate section 76 is an obtuse angle, and the top plate section 76 is formed such that it is directed diagonally to the support plate sections 34*a*, in other words, in a direction not at a right angle.

With the bracket 33*a* on the column side attached to the outer column 24 of the steering column 6*c*, the direction of the edges on both the front and rear end of these support plate sections 34*a* is at nearly a right angle with respect to the direction of the center axis of the outer column 24. Therefore, with the bracket 33*a* on the column side attached to the outer column 24, the center axis of the outer column 24 and the top plate section 76 are not parallel. More specifically, they are inclined at an angle of $\theta_1$ between each other in a direction such that the distance between the center axis of the outer column 24 and the top plate section 76 becomes larger going toward the front. This angle of inclination $\theta_1$ nearly coincides ($\theta_1 \approx \theta_2$) with the installation angle $\theta_2$ (angle of inclination with respect to the horizontal plane $\beta$) of the steering column 6*c* with respect to the vehicle body.

In other words, the steering column 6*c* is installed with respect to the vehicle body in an inclined state with an installation angle $\theta_2$ such that the front side is low and the rear side is high. The top plate section 76 of the bracket 33*a* on the column side is attached in an inclined state with an angle of inclination of $\theta_1$ with respect to the steering column 6*c* that is nearly the same as the installation angle $\theta_2$. Therefore, when installed in the vehicle, the top plate section 76 is nearly in a horizontal direction. In conjunction with this, the bracket 11*e* on the vehicle side that supports this top plate section 76 such that it can break way in the forward direction due to an impact load during a secondary collision is placed in nearly a horizontal direction. More specifically, presuming that the vehicle is on a horizontal surface, and with the steering column 6*c* installed such that it is at a specified angle of inclination that it is in the center position in the tilt direction, the bracket 11*e* on the vehicle side is placed such that it is near parallel with the road (shift in the angle of a virtual line that is parallel with the road is within ±5 degrees, and preferably within ±2 degrees, and even more preferably within ±1 degree).

With the steering column support apparatus of this example constructed as described above, the locking capsule 47*d* can smoothly come out from the locking hole 45*d* of the bracket 11*e* on the vehicle side. In other words, an impact load is applied in nearly a horizontal direction to the steering wheel 1 from the body of the driver during a secondary collision. On the other hand, in the case of the construction of this example, the top plate section 76 of the bracket 33*a* on the column side and the bracket 11*e* on the vehicle side are placed in nearly a horizontal direction. Therefore, the locking capsule 47*d* that is fastened to and supported by the top surface of the top plate section 76 by bolts 51 and nuts 52 can come out from the locking hole 45*d* that is formed in the bracket 11*e* on the vehicle side by moving forward in a horizontal direction, or in other words, not moving in an inclined direction.

As can be clearly seen from the explanation above, in the case of the construction of this embodiment, no shifting occurs in the direction in which the locking capsule 47*d* comes out from the locking hole 45*d* and direction in which the impact load applied to the locking capsule 47*d* acts, or in the case that a shift does occur, the shift is kept very small. Therefore, when the locking capsule 47*d* comes out from the locking hole 45*d* during a secondary collision, no force is applied in the torsional direction to the engagement section between the locking capsule 47*d* and the bracket 11*e* on the vehicle side, or in the case such a force is applied, that force is kept very small.

Particularly, in the case of using the locking capsule 47*d* that is illustrated in FIG. 26A, the distance between the center axis of the steering column 6*c*, which is the input position of the impact load, and the engagement section between the locking capsule 47*d* and the locking hole 45*d* is kept short. Therefore, it is possible to keep torsion that is caused by a moment that is applied to the engagement section due to the size of this distance low. In the construction of this example, because of this, it is possible to keep the contact pressure at the area of rubbing of the bottom surface of the flange section 48*c* of the locking capsule 47*d* and the top surface of the top plate section 76 of the bracket 33*a* on the column side with the top and bottom surfaces of the portions on of both sides of the locking hole 45*d* of the bracket 11*e* on the vehicle side low, so it is possible to keep the friction force acting at these areas of rubbing low. As a result, the energy required for causing the locking capsule 47*d* to displace in the forward direction at the instant that a secondary collision occurs is kept small, and tuning for protecting the driver is simplified. In the case of using the locking capsule 47*e* illustrated in FIG. 26B as well, during a secondary collision, it is possible to keep the contact pressure at the area of rubbing between the inner surfaces of the locking grooves 82 that are formed in the surfaces of the left and right sides of the locking capsule 47e and the bracket 11e on the vehicle side low.

It is also possible to apply the construction of the third embodiment to the first and second embodiments, and it is possible to apply the construction of each of the examples of the first embodiment or second embodiment to this third embodiment.

First Example of Fourth Embodiment

FIG. 27 to FIG. 30 illustrate a first example of a fourth embodiment. The features of this example are the shape of the bracket 11f on the vehicle side and the construction of the portion of the vehicle body 86 that connects and fastens to this bracket 11f on the vehicle side. The construction and functions of other parts are the same as in the first embodiment of the present invention, so explanations of identical parts are omitted or simplified, such that the explanation below centers on the features of this example.

In the steering column support apparatus of this example, the edges on the left and right sides of the portion of the rear half section of the bracket 11f on the vehicle side that is attached to the locking capsule 4 are bent upward at right angles to form a pair of parallel vertical installation plate sections 87. On the other hand, a convex installation section 88 is formed in part of the vehicle body 86 (in a portion that is supposed to support the steering column 6c such as below the dashboard), and the surfaces on the left and right sides of this convex installation section 88 are a pair of installation surfaces 89. The width W of this convex installation section 88 essentially coincides with the space D between the vertical installation plate sections 87 (W≈D). The inside surfaces of these vertical installation plate sections 87 (side surfaces that face each other), when matched with the installation surfaces 89, connect and fasten the bracket 11f on the vehicle side to the vehicle body 86.

Therefore, in this example, together with forming installation holes 90 in the center of the top section of the vertical installation plate sections 87, a through hole that passes in the left/right direction is formed in the convex installation section 88. By screwing a nut 92 onto a bolt 91 that has been inserted through this through hole and the installation holes 90, and tightening, the convex installation section 88 is firmly held between the vertical installation plate sections 87. These vertical installation plate sections 87 are integrated with the bracket 11f on the vehicle side by bending up parts of the metal plate of the bracket 11f on the vehicle side. Therefore, the bent section 70 of the first embodiment does not exist in the portions of the bracket 11f on the vehicle side where the vertical installation plate sections 87 are formed. However, bent sections 85 are formed in the portions separated from the vertical installation plate sections 87 except for the front edge section.

With the kind of steering column support apparatus of this example, it is possible to provide the bracket 11f on the vehicle side with sufficient rigidity even though a metal plate having a large thickness dimension is not used. In other words, in the case of the construction of this example, a pair of vertical installation sections 87 are formed by bending upward at right angles the edge sections on the left and right sides of the rear half section of the bracket 11f on the vehicle side, which is the portion where the locking capsule 47f is attached. By forming this pair of vertical installation plate sections 87, the bending rigidity of the portion of the bracket 11f on the vehicle side where the locking capsule 47f is attached, or in other words, the bending rigidity of the portion where the locking capsule is located in the normal state is increased. The vertical installation plate sections 87 are firmly connected and fastened to the convex installation section 88 on the vehicle body 86 by tightening a bolt 91 and nut 92. Therefore, the rigidity of the vertical installation plate sections 87 and the rear half section of the bracket 11f on the vehicle side where the locking capsule 47f is attached and that is located between the edges on the bottom ends of these vertical installation plate sections 87 is sufficiently increased.

Moreover, this construction makes it possible to increase the natural frequency (resonance frequency) of this rear half section, so that vibration of the steering wheel 1 that is supported by the bracket 11f on the vehicle side by way of the bracket 33 on the column side, the steering column 6c and the steering shaft 5b is prevented even when travelling over a bad road, and thus it is possible to prevent causing discomfort to the driver who operates the steering wheel 1.

Second Example of Fourth Embodiment

Figure 31:
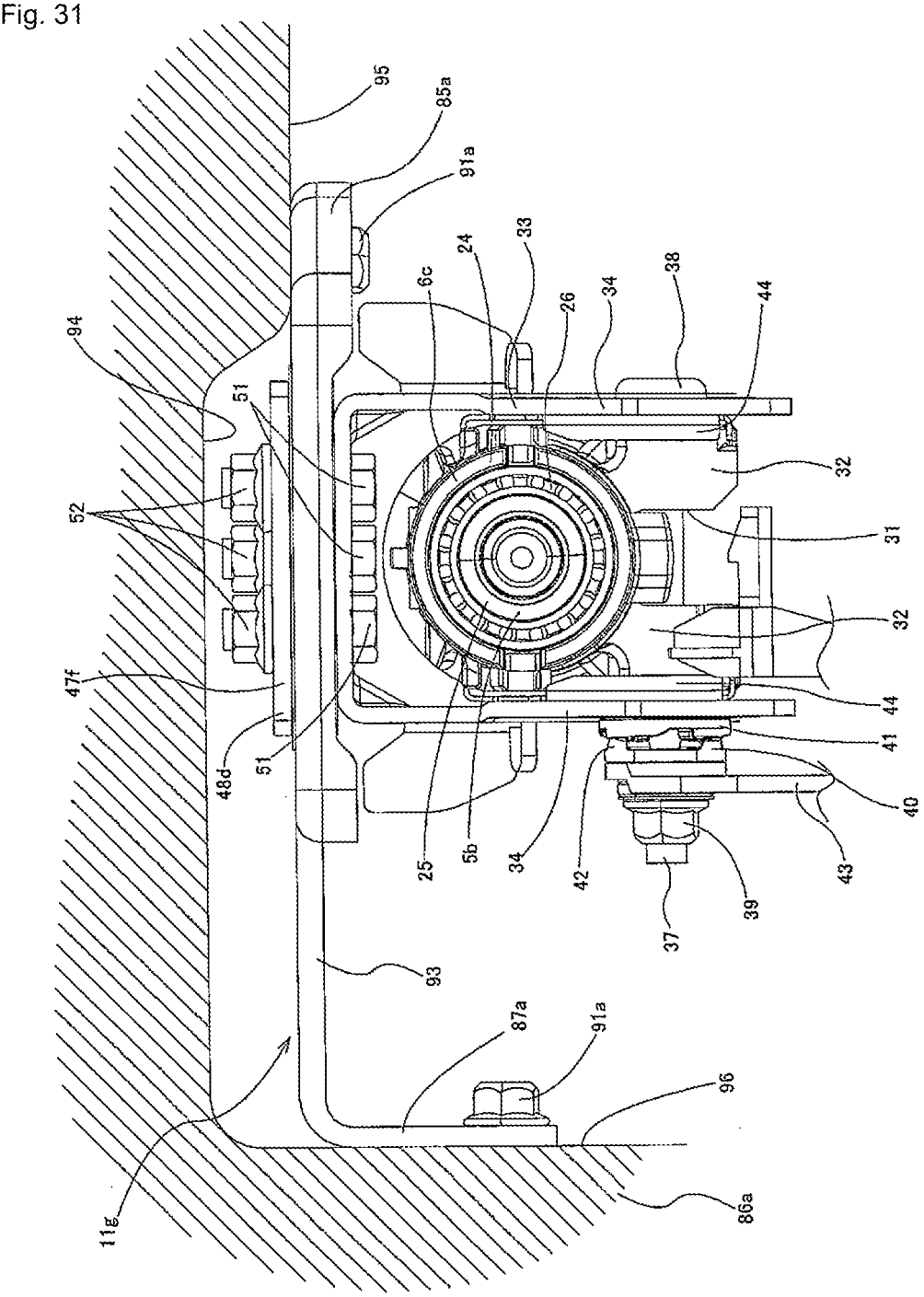
FIG. 31 is a drawing illustrating a second example of the fourth embodiment of the present invention, and is similar to FIG. 30.

FIG. 31 illustrates a second example of the fourth embodiment of the present invention. In this example, a vertical installation plate section 87a is formed by bending downward at a right angle the tip end section of an extending section 93 that extends from the edge of one side (left side edge in FIG. 31) of the bracket 11g on the vehicle side. On the other hand, a bent section 85a that is similar to the bent section 70 of the other embodiments is formed on the edge of the other side (right side edge in FIG. 31) of the bracket 11g on the vehicle side.

A downward facing installation surface 95 and a side facing installation surface 96 are formed on the vehicle body 86a the supports and fastens to the bracket 11g on the vehicle side such that these installation surfaces are on both the left and right sides of a concave section 94 that prevents interference between the bolts 51 and nuts 52 for connecting and fastening the locking capsule 47f and the bracket 33 on the column side. With the outside surface of the vertical installation plate section 87a fitted with the side facing installation surface 96 and the top surface of the portion near the edge on the other side of the bracket 11g on the vehicle side fitted with the downward facing installation surface 95, the bracket 11g on the vehicle side is connected and fastened to the vehicle body 86a by bolts 91a.

Third Example of Fourth Embodiment

Figure 32:
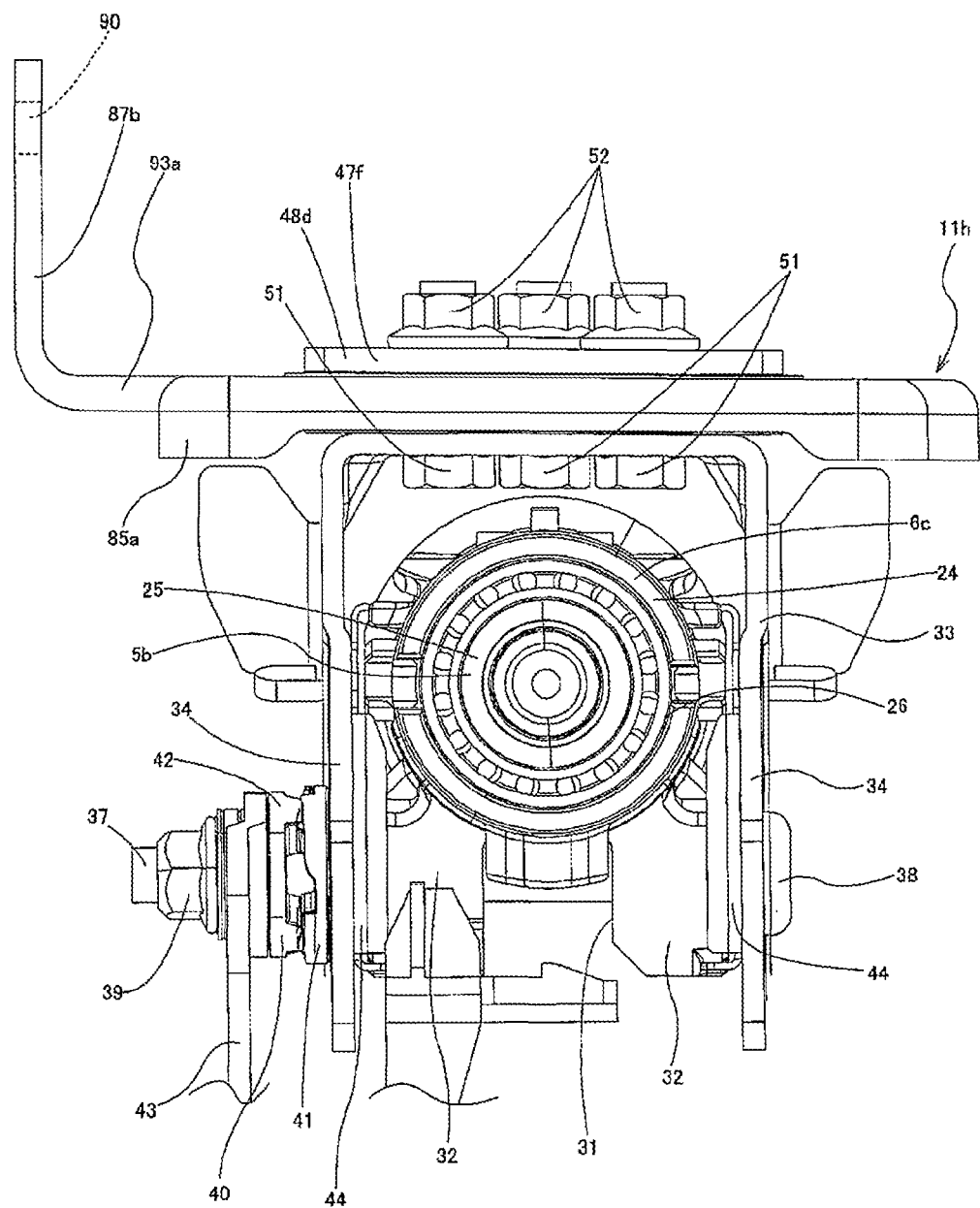
FIG. 32 is a drawing illustrating a third example of the fourth embodiment of the present invention, and is similar to FIG. 30.

FIG. 32 illustrates a third example of the fourth embodiment of the present invention. In this example, a vertical installation plate section 87b is formed by bending upward at a right angle the tip end section of an extending section 93 that extends from the edge of one side (left side edge in FIG. 32) of the bracket 11h on the vehicle side. On the other hand, a bent section 85a that is similar to the bent section 70 of the other embodiments is formed on the edge on the other side (right side edge in FIG. 32) of the bracket 11h on the vehicle side. It is presumed that the shape of the vehicle body matches the shape of the bracket 11h on the vehicle side.

The construction of the bracket on the vehicle side of the fourth embodiment can also be applied to the brackets on the vehicle side of the other embodiments, and the other construction of each of the examples of the other embodiments can also be applied to this fourth embodiment.

INDUSTRIAL APPLICABILITY

The case of applying the present invention to a steering column support apparatus that comprises both a tilt mechanism for adjusting the up/down position of a steering wheel, and a telescopic mechanism for similarly adjusting the forward/backward position of the steering wheel was explained. However, the present invention can also be applied to a steering column support apparatus that comprises only a tilt mechanism or only a telescopic mechanism, and can be applied to a fixed steering wheel type steering column support apparatus that does not comprise either of these mechanisms.

EXPLANATION OF REFERENCE NUMBERS

1 Steering wheel
2 Steering gear unit
3 Input shaft
4 Tie rod
5, 5a, 5b Steering shaft
6, 6a, 6b, 6c Steering column
7 Universal joint
8 Intermediate shaft
9 Universal joint
10, 10a Housing
11, 11a, 11b, 11c, 11d, 11e, 11f, 11g, 11h Bracket on the vehicle side
12, 12a Bracket on the column side
13 Bracket on the housing side
14a, 14b Installation plate section
15a, 15b Cut out section
16a, 16b Sliding plate
17 Energy absorbing member
18 Locking notch
19 Locking capsule
20, 20a Locking groove
21a, 21b Locking hole
22 Locking pin
23 Inner column
24 Outer column
25 Outer shaft
26 Ball bearing
27 Electric motor
28 Controller
29 Support cylinder
30 Center hole
31 Slit
32 Supported plate section
33, 33a Bracket on the column side
34, 34a Support plate section
35 Long hole in the up/down direction
36 Long hole in the forward/backward direction
37 Adjustment rod
38 Head section
39 Nut
40 Driving cam
41 Driven cam
42 Cam apparatus
43 Adjustment lever
44 Friction plate unit
45, 45a, 45b, 45c, 45d, 45e Locking hole
46 Installation hole
47, 47a, 47b, 47c, 47d, 47e, 47f Locking capsule
48, 48a, 48b, 48c, 48d Flange section
49a, 49b, 49c Small through hole
50 Connecting pin
51, 51a Bolt
52 Nut
53 Energy absorbing member
54 Rivet
55 Small notch section
56 Synthetic resin
57 Small space
58 Base section
59 Bent back section
60 Extending section
61 Locking edge section
62 Side section
63 Convex surface section
64 Hanging plate section
65 Small through hole
66 Space
67 Eave section
68 Space
69 Installation plate section
70 Bent section
71 Wave shaped portion
72 Space
73 Base plate section
74 Raised section
75 Flange section
76 Top plate section
77 Weld
78 Locking groove
79 Metal plate
80 Convex curved surface
81 Through hole in the circumferential direction
82 Locking groove
83 Head section
84 Reinforcement rib section
85, 85a Bent section
86, 86a Vehicle body
87, 87a, 87b Vertical installation plate section
88 Installation convex section
89 Installation surface
90 Installation hole
91, 91a Bolt
92 Nut
93, 93a Extending section
94 Concave section
95 Downward facing installation surface
96 Side facing installation surface

What is claimed is:

1. A steering column support apparatus, comprising:
a bracket on the vehicle side having a locking hole that extends in the axial direction of a steering column and that is located in the center section in the width direction thereof, this bracket on the vehicle side not displacing in the forward during a secondary collision;
a bracket on the column side that is supported by the steering column; and
a locking capsule that is fastened to the steering column, and in the fastened state, comprises a locked section with both end sections locked in the locking hole, and a top side section that is formed on the top side of the locked section, having a width dimension that is greater than the maximum width dimension of the locking hole, and having a flange section that is positioned on the top side of the bracket on the vehicle side on both sides of the locking hole;
with the locked section of the locking capsule located on the inside of the locking hole, by connecting the locking capsule and the bracket on the vehicle side by way of connecting members that shear due to an impact load that is applied during a secondary collision, the bracket on the column side being supported by the bracket on the vehicle side so as to be able to break away in the forward direction due to the impact load that is applied during the secondary collision, the steering column support apparatus further comprising an energy absorbing member that is provided between the locking capsule and the bracket on the vehicle side, and absorbs impact energy that is applied to the locking capsule and allows forward displacement of the locking capsule by plastically deforming during the secondary collision;

this energy absorbing member being formed by bending a wire that is capable of plastic deformation, and comprising a base section having a shape that is open in the rear, a pair of bent back sections that are formed by bending back the wire from the both end sections in the rear of the base section downward and toward the front to form a U shape, and a pair of left and right extending sections that extend forward from the tip ends of the bent back sections;

the base section spanning from the front surface of the top section of the locking capsule along the surfaces on both the left and right sides;

the edges on the front sides of the bent back sections facing the rear end edge of the bracket on the vehicle side at two locations, left and right; and the extending sections extending from the bent back sections toward the front and are located at two positions, left and right, underneath the bracket on the vehicle side.

2. The steering column support apparatus according to claim 1, wherein the base section of the energy absorbing member and the perimeter edge of the locking capsule engage with part of this perimeter edge existing further upward that the base section, so even when the locking capsule has come out all the way forward from the locking hole, the locking capsule is supported by the bracket on the vehicle side by way of the energy absorbing member, preventing the steering column from dropping down.

3. The steering column support apparatus according to claim 2 wherein eave sections that protrude further toward the side than the portion underneath are formed on the top end section of the surfaces on the left and right sides of the locking capsule, and the base section of the energy absorbing member is located underneath the eave sections.

4. The steering column support apparatus according to claim 1 wherein by bending parts of the rear end section of the bracket on the vehicle at two locations, left and right, which are at least parts in the width direction of the rear end section of the metal plate of the bracket on the vehicle side, convex surface sections having partial cylindrical surfaces, and hanging plate sections that are located on the bottom sides of these convex surface sections, having small through holes in the forward/backward direction thereof are formed, and with the edges of the front sides of the bent back sections facing the concave surface sections, the extending sections are inserted from the rear toward the front through the small through holes.

5. The steering column support apparatus according to claim 1, wherein a plurality of connecting members are formed to span between a plurality of through holes that are formed in the flange section and a plurality of small notch sections that are formed at locations on part of the bracket on the vehicle side that are aligned with the plurality of through holes and that are open toward the inside of the locking hole; and part of the material of the connecting members penetrates between the inside surfaces of the locking hole and the surfaces of the locking capsule that face those inside surfaces, covering at least part of the space existing between these surfaces.

6. The steering column support apparatus according to claim 5, wherein the material of the plurality of connecting members is synthetic resin;

the synthetic resin is injected into the small through holes and small notch sections by injection molding; and part of the synthetic resin covers the entire length of the space that exists between the inside surfaces of the locking hole and the surfaces of the locking capsule that face those inside surfaces.

7. The steering column support apparatus according to claim 5, wherein in addition to the space existing between the inside surfaces of the locking hole and the surfaces of the locking capsule that face those inside surfaces, the material of the connecting members covers at least part of the space that exists between the top and bottom surfaces of the bracket on the vehicle side and the opposing surfaces that face these top and bottom surfaces.

8. The steering column support apparatus according to claim 1, wherein at least the left and right edges of the rear half section of the locking hole are inclined in a direction toward each other going toward the rear, and the edges on the left and right sides of the locked section of the locking capsule are inclined in a direction such that the width dimension between them becomes smaller going toward the rear.

9. The steering column support apparatus according to claim 1, wherein the length in the forward/backward direction of the locking hole is longer than the length in the same direction of the locking capsule, and is long enough that even when the locking capsule has displaced in the forward direction, at least part of the locking capsule is located on the top side of the front end section of the bracket on the vehicle side, making it possible to prevent the locking capsule from dropping down.

* * * * *